(12) United States Patent
Brookover et al.

(10) Patent No.: US 11,055,798 B1
(45) Date of Patent: Jul. 6, 2021

(54) DATA MANAGEMENT SYSTEMS FOR SCHOLARSHIP PROGRAMS

(71) Applicant: Empower Illinois, Chicago, IL (US)

(72) Inventors: Brian D. Brookover, Chicago, IL (US); Meggan Muller, Chicago, IL (US)

(73) Assignee: EMPOWER ILLINOIS, Chicago, IL (US)

( * ) Notice: Subject to any disclaimer, the term of this patent is extended or adjusted under 35 U.S.C. 154(b) by 0 days.

(21) Appl. No.: 16/670,686

(22) Filed: Oct. 31, 2019

(51) Int. Cl.
*G06Q 50/20* (2012.01)
*G06F 16/2457* (2019.01)

(52) U.S. Cl.
CPC ... *G06Q 50/2053* (2013.01); *G06F 16/24578* (2019.01)

(58) Field of Classification Search
CPC ............... G06Q 50/20; G06Q 50/2053; Y10S 707/942; G06F 16/24578
See application file for complete search history.

(56) References Cited

U.S. PATENT DOCUMENTS

| | | | | |
|---|---|---|---|---|
| 2005/0004807 A1* | 1/2005 | Fenstermaker | .... | G06Q 10/0637 705/26.1 |
| 2009/0117969 A1* | 5/2009 | Englman | ............. | G07F 17/3276 463/20 |
| 2013/0006884 A1* | 1/2013 | Carroll | ................... | G06Q 40/02 705/322 |
| 2015/0050625 A1* | 2/2015 | Stein | ........................ | G09B 5/02 434/169 |
| 2016/0210618 A1* | 7/2016 | Pace | ....................... | G06Q 20/38 |
| 2019/0102854 A1* | 4/2019 | Terra | .................... | G06F 16/9535 |
| 2020/0226867 A1* | 7/2020 | Komo | ........................ | H04L 9/12 |

OTHER PUBLICATIONS

Tullis, Tracy "How to Fill Out the FAFSA, Step-by-Step" Carnegie Dartlet, as archived Sep. 20, 2019; available at: https://web.archive.org/web/20190920131014/https://www.collegexpress.com/articles-and-advice/financial-aid/articles/applying-financial-aid/how-fill-out-fafsa-step-step/ (Year: 2019).*

(Continued)

*Primary Examiner* — Andrew B Whitaker
*Assistant Examiner* — Brendan S O'Shea
(74) *Attorney, Agent, or Firm* — Polsinelli PC

(57) ABSTRACT

Technologies are provided for managing scholarship programs. An example method can include receiving scholarship applications for students, each scholarship application identifying school preferences and a household income of a student, the school preferences defining a ranked set of school entities; calculating a prioritized scholarship queue of students based on the scholarship applications and criteria including reservation dates associated with the students and the household income associated with each student; matching each student in the prioritized scholarship queue with a scholarship(s) for a school entity identified in the school preferences associated with the student; for each student, determining whether one or more scholarship pools have sufficient funds for the scholarship(s), the one or more scholarship pools corresponding to the school entities identified in the school preferences associated with the student; and when a scholarship pool has sufficient funds for a scholarship, reserving funds for the scholarship from the scholarship pool.

20 Claims, 12 Drawing Sheets

(56) References Cited

OTHER PUBLICATIONS

Fay, Bill "Need-Based Scholarships & Grants" Debt.org, as archived Sep. 12, 2015; available at: https://web.archive.org/web/20150912041414/https://www.debt.org/students/scholarships-and-grants/need-based-scholarships-grants/ (Year: 2015).*

SurveyMonkey Apply "Apply for Scholarship Providers" as archived Aug. 23, 2018; available at: https://web.archive.org/web/20180823220525/https://apply.surveymonkey.com/solutions/scholarships/ (Year: 2018).*

* cited by examiner

School System Portal

- Dashboard
- Donations
- Awards
- Forms
- Resources
- Account
- Logout

Example School System    2019-20

List of Schools

| School | Applicants | Waitlist | Other Award States | Conditional Award | Award Confirmed | Funding Confirmed | Funds Awarded |
|---|---|---|---|---|---|---|---|
| School 1 | 50 | 48 | 23 | 2 | 0 | 7 | $39,154 |
| School 2 | 0 | 0 | 0 | 0 | 0 | 0 | $0.00 |
| School 3 | 0 | 0 | 0 | 0 | 0 | 0 | $0.00 |
| School 4 | 0 | 0 | 0 | 0 | 0 | 0 | $0.00 |
| School N | 0 | 0 | 0 | 0 | 0 | 0 | $0.00 |

FIG. 5

Admin
Dashboard ~ 602

| Donation Upload | School Participation Agreements Completed | School Commitment Forms Completed |
|---|---|---|
| Import  Choose File | 658 / 658 | 20 / 35 |

Total Donations for Current School Year

| | | | |
|---|---|---|---|
| Designated School | School System | Undesignated | Total |
| $877,237.74 | $285,815.00 | $441,229.32 | $1,605,282.05 |

Cumulative Donation Balances

| | | | |
|---|---|---|---|
| Designated School | School System | Undesignated | Total |
| $718,126.85 | $272,474.25 | $284,755.85 | $1,275,356.95 |

Awards for Current School Year

| | Conditional Award | Award Confirmed | Funding Confirmed |
|---|---|---|---|
| Number of Awards | 115 | 65 | 3,093 |
| Total Dollars | $770,246.02 | $467,666.19 | $18,124,989.66 |

FIG. 6

DATA MANAGEMENT SYSTEMS FOR SCHOLARSHIP PROGRAMS

TECHNICAL FIELD

The present disclosure generally relates to data management systems and, more specifically, to scholarship management systems.

BACKGROUND

In today's public school systems, a child generally attends school based on where the child lives, as children are mostly assigned to schools based on the school district they live. Unfortunately, not all public schools have the same access to resources, and many are unable to provide the same quality of education as other public schools with access to more resources. Consequently, in some cases, a child may opt out of attending public school and instead enroll in a private school that may have a better academic record or access to more resources, or may be more suitable for the child. This is more common with children of higher-income families, as private schools can be expensive. Thus, in many cases, children who live in poverty or come from lower-income families are unable to attend a private school and may instead have to attend a public school that may not be able to provide the same quality of education and level of opportunities as some private schools. Moreover, children with certain special needs are often unable to attend a private school that may be better suited for their special needs.

Some jurisdictions and organizations have created scholarship programs to allow students from lower-income families and students with certain special needs to attend a private school that is more suitable for the student or capable of providing better opportunities for the student. However, such scholarship programs are generally managed by systems that have limited scalability, capabilities and efficiency. In addition, such systems typically lack flexibility, transparency and granularity. As a result, many students are often unable to receive a scholarship through the system and the system is only able to serve a more limited amount of students and schools.

BRIEF DESCRIPTION OF THE DRAWINGS

In order to describe the manner in which the various advantages and features of the disclosure can be obtained, a more particular description of the principles described above will be rendered by reference to specific embodiments thereof which are illustrated in the appended drawings. Understanding that these drawings depict only example embodiments of the disclosure and are not to be considered to limit its scope, the principles herein are described and explained with additional specificity and detail through the use of the drawings in which:

FIG. 5 illustrates an example configuration of a school system portal on a school system site hosted by a web interface service of a scholarship management system, in accordance with some examples;

FIG. 6 illustrates an example dashboard presented from an administrator site hosted by a web interface service of a scholarship management system, in accordance with some examples;

DETAILED DESCRIPTION

Figure 1:
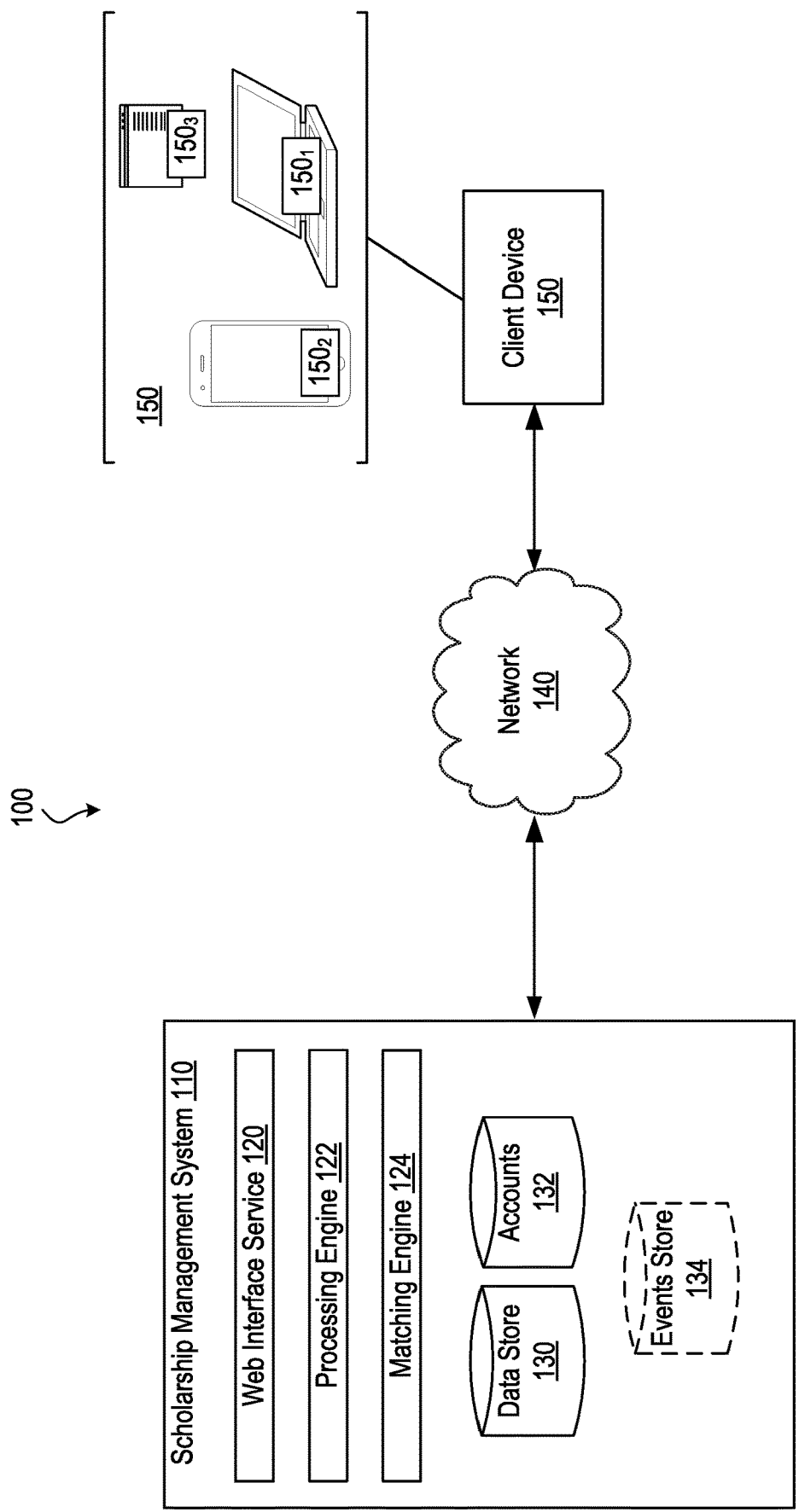
FIG. 1 illustrates an example environment for implementing and managing scholarship programs and integrating related systems and data, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously noted, scholarship programs for students are generally managed by systems that have limited scalability, capabilities and efficiency, and often lack flexibility and granularity. As a result, many students are often unable to receive a scholarship through the system and the system is only able to serve a more limited amount of students and schools. For example, scholarship systems typically have a limited window for students to reserve scholarships and for the system to process scholarship applications, as opposed to having rolling applications and processing. Consequently, many students who are unable to take the necessary steps to receive a scholarship within the limited window are left out of the scholarship program.

Moreover, such systems are often bogged down with a high amount of applications and traffic within a shorter timespan as all applications and scholarships are processed within the limited window. In many cases, the systems become burdened and crash as they are unable to manage the higher volume of traffic and processing. The limited flexibility of such systems and their lack of granularity in their algorithms for matching students to scholarships and schools also prevent the systems from effectively accommodating the needs and requirements of certain schools, students, donors and scholarship programs. Indeed, such systems often require a significant amount of manual steps and processing which further limit their performance and efficiency.

By contrast, the technologies herein can manage scholarship programs and related data efficiently and intelligently, and can provide a significant amount of automation and flexibility to accommodate different needs of schools, students, donors and scholarship programs. The technologies herein can process scholarships on a rolling basis, and can match students with scholarships and school with a great deal of granularity. As a result, the technologies herein provide much more scalability and stability, enabling the system to efficiently process and manage a greater amount of scholarships and scholarship programs. This, in turn, can also open scholarship opportunities to a much wider range of students and schools and allow for more choices for those students and greater flexibility for the schools the students attend.

Figure 7:
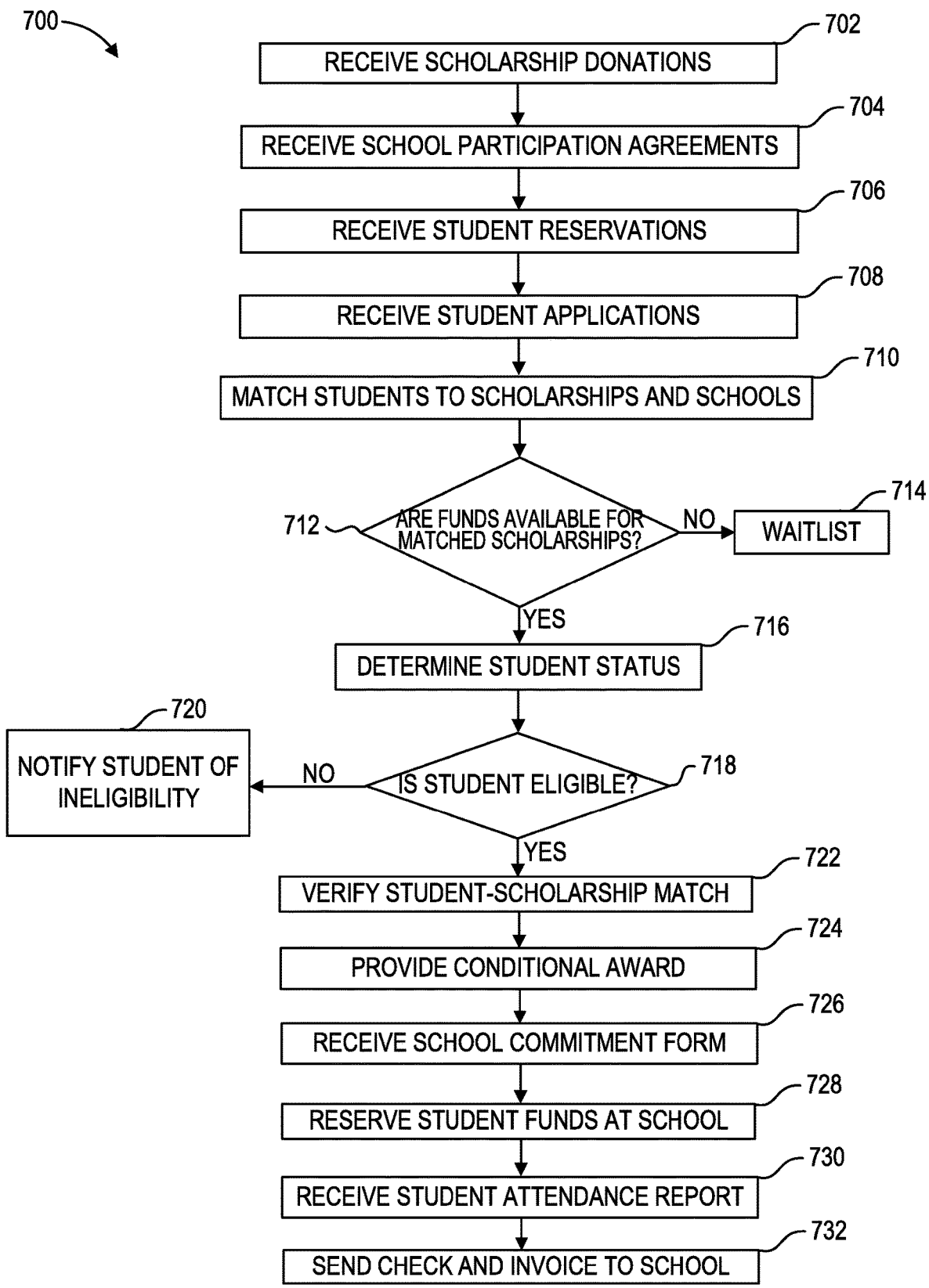
FIG. 7 illustrates an example flowchart for managing scholarship programs, in accordance with some examples.
Figure 8:
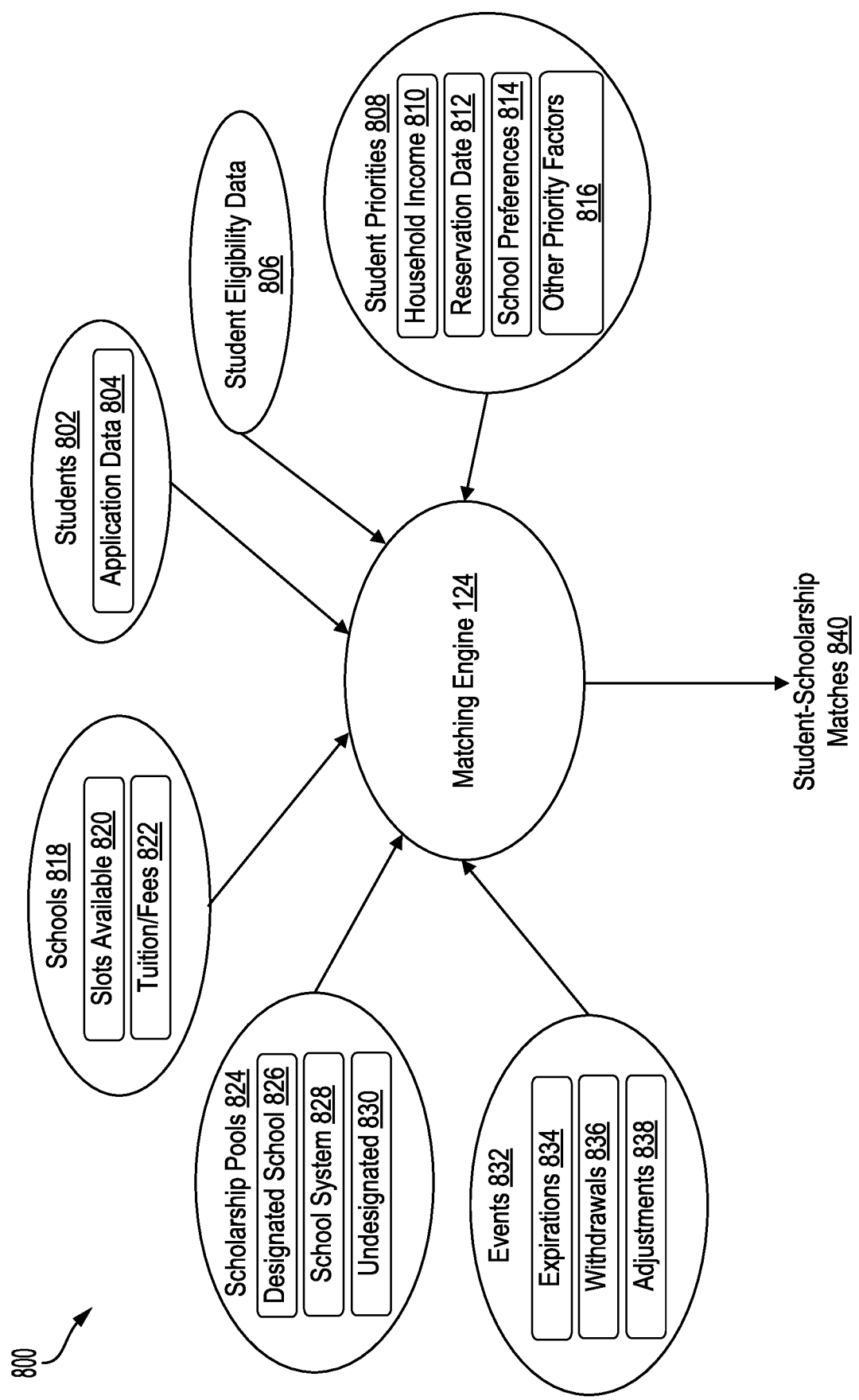
FIG. 8 illustrates an example cloud map diagram depicting different factors that can be used to match students to scholarships, in accordance with some examples.
Figure 9:
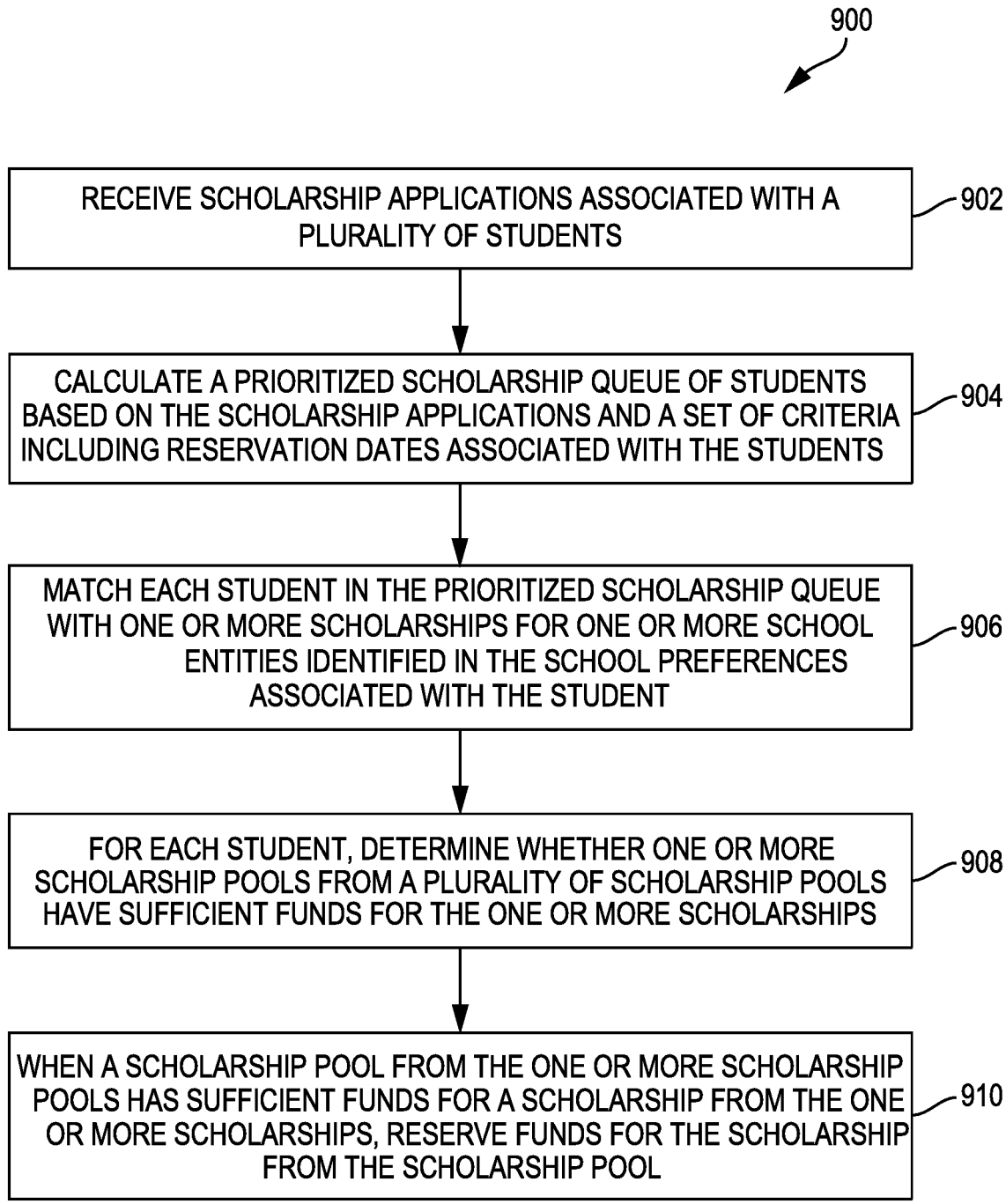
FIG. 9 illustrates an example method for managing scholarship programs, in accordance with some examples.
Figure 10:
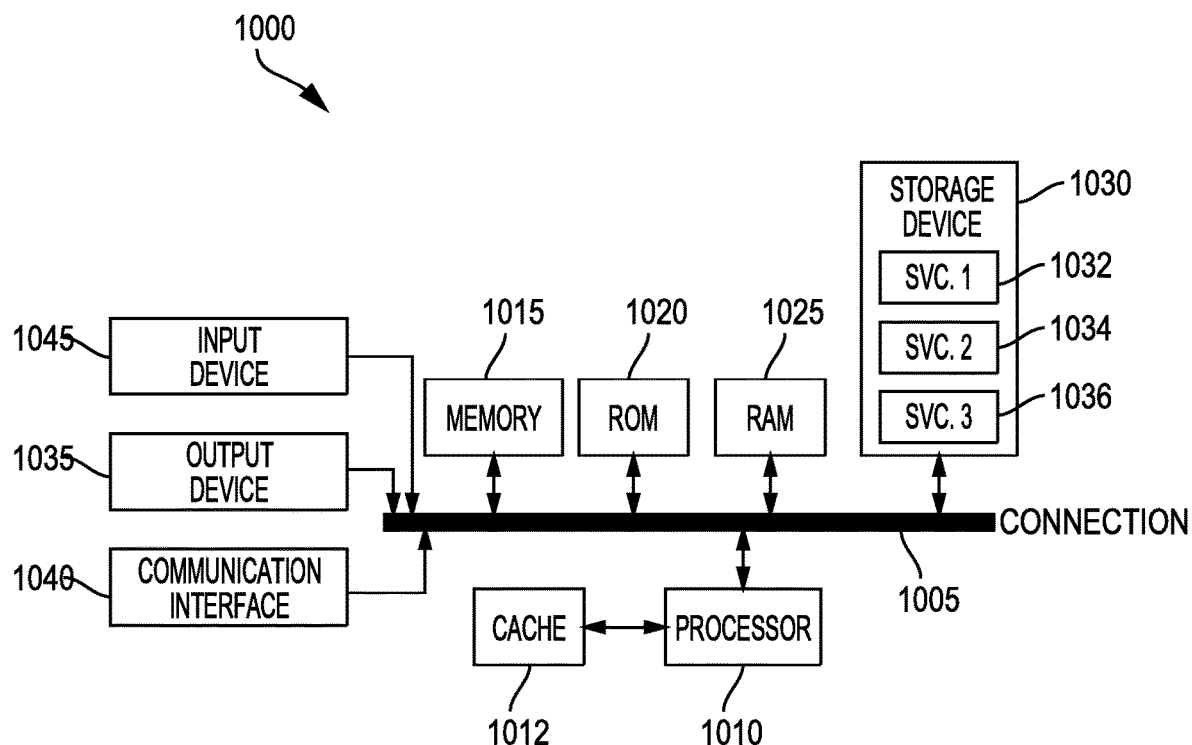
FIG. 10 illustrates an example computing device architecture, in accordance with some examples.

The present technology will be described in the following disclosure as follows. The discussion begins with a description of example systems, architectures, and technologies for managing scholarship programs, as illustrated in FIGS. 1 through 6. A description of example flows, algorithms and methods for managing scholarship programs, as illustrated in FIGS. 7 through 9, will then follow. The discussion concludes with a description of an example computing device architecture including example hardware components suitable for performing various scholarship management operations, as illustrated in FIG. 10. The disclosure now turns to FIG. 1.

FIG. 1 illustrates an example environment 100 for implementing and managing scholarship programs and integrating related systems and data. In this example, environment 100 depicts a scholarship management system 110 interacting with a client device 150. The client device 150 can communicate with the scholarship management system 110 to obtain scholarship services and data as described herein. Moreover, the client device 150, as well as any other client devices (e.g., 150$_1$, 150$_2$, 150$_3$) can communicate with the scholarship management system 110 via a network 140. Network 140 can include one or more private and/or public networks such as, for example and without limitation, a local area network (LAN), a wide area network (WAN), a private cloud, a public cloud, a hybrid cloud, a virtual private network (VPN), a wireless network, etc.

The client device 150 can include any computing device such as, for example and without limitation, a laptop computer, a desktop computer, a tablet computer, a smartphone, an IoT (Internet of Things) device, a smart television, a smart wearable device, etc. The scholarship management system 110 can include one or more physical and/or virtual/logical nodes, networks, and/or computing devices. For example, in some cases, the scholarship management system 110 can include, without limitation, one or more servers, storage systems, virtual machines (VMs), software containers, service chains, compute resources, datacenters, networks, etc. In some examples, the scholarship management system 110 can be hosted in one or more networks, such as one or more private networks, datacenters, clouds, etc.

The scholarship management system 110 can include a web interface service 120, a processing engine 122, a matching engine 124, a data store 130, and an accounts store 132. In some cases, the scholarship management system 110 can optionally include an events store 134, as depicted by the dotted outline of the events store 134 shown in FIG. 1. The web interface service 120 can host and provide one or more websites and/or web interfaces, which the client device 150 can access via the network 140. The client device 150 can access data and services provided by the scholarship management system 110 through the one or more websites and/or web interfaces provided by the web interface service 120.

In some examples, the web interface service 120 can provide a web interface and/or portal for students and families, a web interface and/or portal for schools, a web interface and/or portal for school systems, and/or a web interface and/or portal for administrators. In such examples, students and families, schools, school systems, and administrators can access and manage respective scholarship data and services through their respective web interfaces and/or portals. Moreover, in some cases, the web interface service 120 can provide a web interface and/or portal for one or more other entities such as, for example and without limitation, one or more scholarship donors, one or more government agencies, one or more service and/or data providers, etc.

In some cases, the one or more websites and/or web interfaces hosted and provided by the web interface service 120 can provide data and services for implementing and managing scholarship programs. For example, in some cases, the one or more websites and/or web interfaces hosted and provided by the web interface service 120 can provide, without limitation, data and services for managing funds and scholarships for one or more scholarship services; managing school, school system, and student information associated with one or more scholarship services; verifying student eligibility for one or more scholarship programs; matching students to schools for allocating scholarships to students; managing and allocating scholarships for matched students and schools; disbursing scholarship funds to schools for specific students; verifying information and compliance to rules and/or requirements associated with the one or more scholarship programs; administering one or more scholarship programs; etc.

The processing engine 122 can process donations to one or more scholarship programs, manage scholarship pools, process scholarship applications, perform student scholarship eligibility checks, manage student eligibility amounts, process scholarship payments, manage accounting for one or more scholarship programs, verify school attendance for scholarship recipients based on attendance reports from associated schools, verify student-scholarship matches calculated by the matching engine 124 as described below, determine whether a student's scholarship application requires additional information for the determination of eligibility, verify information in a student's scholarship application, determine whether a student's eligibility or application has expired (e.g., because a scholarship was awarded but the student or parent/guardian did not take action before an expiration period), generate notifications/alerts, check for errors or inconsistencies in the system, manage rules and/or requirements for scholarship programs, etc.

The processing engine 122 can determine whether a student is eligible for a scholarship from one or more scholarship programs based on one or more eligibility requirements or rules associated with the one or more scholarship programs. For example, in some cases, the processing engine 122 can determine a student's eligibility based on a household income associated with the student. To illustrate, a scholarship program may include an eligibility rule that defines a threshold household income necessary for a student to qualify for a scholarship. In some examples, the threshold household income can be based on the federal poverty line. For example, the threshold household income can be set to a certain amount or percentage above or below the federal poverty line for a specific household size.

Moreover, in some cases, the threshold household income can vary or be adjusted for some students based on one or more factors. For example, the threshold household income for a particular student can be increased based on, for example and without limitation, whether the student received a scholarship in a previous year, whether a family member has received a scholarship through the scholarship program, whether the student qualifies for a specialized or particular educational program (e.g., an individualized educational program (IEP), an individuals with disabilities education act (IDEA) program, an English language learner (ELL) program, a gifted program, etc.), whether the student lives in a particular school district configured to impact the student's threshold household income (e.g., a low performing school district, etc.), and/or any other factor defined for the applicable scholarship program.

In some cases, the processing engine 122 can determine a student's eligibility amount based on a fixed or baseline amount defined by the applicable scholarship program for all students or students in one or more specific regions (e.g., school districts, cities, states, etc.). However, in some cases, a student's eligibility amount can be increased based on one or more factors defined for the applicable scholarship program. For example, a student's eligibility amount can be increased based on the student's household income, whether the student received a scholarship in a previous year, whether a family member has received a scholarship through the scholarship program, whether the student qualifies for a specialized or particular educational program (e.g., IEP, IDEA, ELL, gifted, etc.), and/or any other factor defined for the applicable scholarship program. Thus, when determining a student's eligibility amount, the processing engine 122 can consider whether any of such factors or multipliers applies to that student, and make any adjustments accordingly. Moreover, in some cases, when determining a student's scholarship amount, the processing engine 122 can calculate a specific scholarship percentage based on the income of the student's family. For example, the processing engine 122 can calculate scholarships ranging from 50% to 75% to 100% based on the income of an applicant's family.

When allocating, reserving, verifying or disbursing funds for a student's scholarship, the processing engine 122 can consider the student's eligibility amount and the school's actual cost for that student. The processing engine 122 can calculate the lesser of the student's eligibility amount and the school's actual cost for that student, and verify that amount as the scholarship amount for that student. The actual cost of a school for a particular student can depend on the school's tuition/fees (e.g., as reported by that school in a school commitment form as described herein), any particular educational program(s) the student qualifies for (e.g., IEP, IDEA, ELL, gifted, etc.), any discounts available to or received by the student (e.g., a discount provided to that student by the school), and/or any other factors that may impact the actual cost of the school for that student.

In some examples, the processing engine 122 can service payment accounts, such as Education Savings Accounts (ESAs), and manage other types of scholarship payments and contributions. For example, in some cases, the processing engine 122 can service ESAs to allow parents/guardians to enroll their children in private schools and receive a deposit of funds, either public or private, into government (e.g., state or federal) authorized savings accounts with restricted, but varied, uses. Such funds, which can be managed by families via debit cards, can cover private school tuition and fees, online learning programs, private tutoring, college costs, higher education expenses and/or other personalized and customized learning services and therapies such as occupational and speech therapy.

As an example, the processing engine 122 can manage an ESA program for students with special needs so their parents or guardians can pay for services funded by a state (or any other government/jurisdiction) and administered by an approved scholarship granting organization. Non-limiting examples of such services can include private school tuition, therapy, curriculum, home education, online education, tutoring, and/or postsecondary educational institutions in the student's state or region.

In some cases, a special needs student can have an Individualized Education Program (IEP) and can be identified as having special needs as defined under the Individuals with Disabilities Education Act (IDEA), including, for example, a traumatic brain injury, an orthopedic impairment, a serious emotional disturbance, a hearing or visual impairment, a speech or language impairment, an intellectual disability, autism, another health impairment and/or a specific learning disability.

In some examples, the processing engine 122 can service tax credit scholarship programs and ESA programs, which can be managed separately or can be combined so that a scholarship program can be financed by tax credits provided to donors, including individuals and corporations, and managed by parents as Education Savings Accounts for their students.

In some cases, the processing engine 122 and the web interface service 120 can implement provider accounts/portals that can exist for an ESA and/or any other program. In some implementations, such provider accounts/portals can be associated with specific forms that can be completed to setup, implement, update, administer, etc., the provider accounts/portals. In some cases, the processing engine 122 and web interface service 120 can implement a processing portal for managing and/or performing verifications of forms completed for specific accounts, such as ESAs.

The processing engine 122 can process and manage payments in one or more ways. For example, in some implementations, the processing engine 122 can create lists of students receiving scholarships to be paid by a scholarship granting organization in one or more annual distributions for each participating school, provide a remittance transmittal that summarizes the payment made on an account of each student and pay each school via an ACH transaction or a check.

In some examples, the processing engine 122 can determine the amount of each payment based on the number of payments in the year and one or more predefined rules corresponding to the particular scholarship program. If a student leaves after a payment is made, the processing engine 122 can determine the amount that the school should be invoiced based on the rules of the scholarship program (e.g., SGO business rules, statutory languages, etc.).

The processing engine 122 can interface or integrate with the web interface service 120 to implement a processing portal as previously mentioned. The processing portal can be used to verify self-reported eligibility data for scholarship programs. In some cases, the review tasks for such verification can be completed on a single page hosted by the processing portal (e.g., via the web interface service 120) with limited steps (e.g., clicks, inputs, etc.) to increase the efficiency of processing student applications.

The matching engine 124 can match students to scholarship funds and schools. The matching engine 124 can match eligible students to scholarship funds for schools based on a variety of factors such as, for example, student preferences, student priority queues, student eligibility amounts, school costs (e.g., tuition/fees and any applicable adjustments), available scholarship funds, available school slots, etc. For example, in some cases, the scholarship management system 110 can maintain different pools for different scholarship funds, which the matching engine 124 can use, along with other factors as described below, to match students to scholarships. To illustrate, the scholarship management system 110 can maintain a first pool of scholarship funds containing scholarship funds designated for specific schools, a second pool of scholarship funds containing scholarship funds designated for specific school systems, and a third pool of scholarship funds containing undesignated scholarship funds (e.g., scholarship funds that have not been designated for any particular school or school system).

In some examples, the mapping of scholarship funds to particular pools can be based on any instructions or designations provided (e.g., by a donor or provider) for scholarship funds donated or provided for a particular scholarship program. For example, if a donor donates scholarship funds for a scholarship program and designates those funds to a particular school, the donated funds can be added to a pool of scholarship funds designated for that particular school. If the donor instead designates those funds to a particular school system, the donated funds can instead be added to a different pool of scholarship funds designated for that particular school system. On the other hand, if the donor does not designate any particular school or school system for the funds, the donated funds can be instead added to an undesignated pool of scholarship funds which contains funds that have not been designated to any particular school or school system.

The matching engine 124 can also calculate priority queues or classifications for students in the system and match students to scholarship funds in particular scholarship pools based on the students' respective places in the priority queues or classifications, the amount of available funds (if any) in any scholarship pools applicable to such students, the students' eligibility amounts, the costs associated with the students' preferred schools, and/or the number of open slots at the various schools or school systems selected by students. To calculate priority queues for students, the matching engine 124 can consider a number of factors such as, for example, a student's reservation date, a student's household income, the particular district where the student resides, whether the student or a family member has received a scholarship award in the particular scholarship program, etc.

In some cases, the matching engine 124 can place students in different, tiered priority queues. For example, in some cases, eligible students (e.g., students who meet the requirements for eligibility into a particular scholarship program) can be placed in order to receive a scholarship based on specific criteria. The matching engine 124 can then prioritize students who obtain a reservation date before a reservation or application deadline for the applicable school year based on their respective reservation dates (e.g., earlier dates can receive a higher priority than later dates and/or can be placed in a higher priority queue). On the other hand, the matching engine 124 can assign a lower priority to students who obtain a reservation date that is after the reservation or application deadline for that school year or place them in a separate, lower-priority queue.

Moreover, in some cases, in addition to prioritizing students based on reservation dates, the matching engine 124 can further prioritize students based on one or more other factors, such as a student's household income, the particular district where the student resides, whether the student or a family member has received a scholarship from the scholarship program, etc. For example, the matching engine 124 can prioritize students who did obtain a reservation before the reservation or application deadline based on their respective reservation dates. The matching engine 124 can then identify any students having a household income below a threshold, and increase the respective priorities of those students by a certain amount. The matching engine 124 can also identify any students residing in one or more particular school districts that are configured to boost a student's priority (e.g., school districts with low academic performance such as Focus and/or priority districts), and increase the respective priorities of those students by a certain amount. For any students having received a scholarship from the scholarship program in a previous year or having a family member that has received a scholarship through the scholarship program, the matching engine 124 can similarly increase their respective priorities by a certain amount.

In some cases, the certain amount by which a student's priority is increased can be the same for all of the factors used by the matching engine 124 to increase a student's priority. In other cases, the certain amount by which a student's priority is increased can vary depending on the applicable factor used to boost that student's priority. For example, a student whose family's income is below a particular threshold may have his or her priority increased (A) more than a student having a family income above the particular threshold and below a higher threshold, (B) for living in a particular school district (such as one with poorly performing public schools), (C) for having previously received a scholarship through the scholarship program or (D) for having a sibling who has received a scholarship through the scholarship program. In any case, the factors configured to provide a priority boost to a student and/or the amount by which a student's priority is increased based on one or more priority boosting factors can be predetermined, configurable, and/or can vary.

In some cases, the matching engine 124 can prioritize students and/or adjust student priorities based on different tiers of household incomes. For example, a student in a lower household income tier (e.g., a tier having a lower household income threshold) can be assigned a higher priority or can receive a higher (or any) priority boost than a student in a higher income tier (e.g., a tier having a higher household income threshold than the lower household income tier). Other criteria such as the active duty military status of a student's parent or guardian can be used to prioritize the award of scholarships. The number of household income tiers can vary in different implementations.

Once the matching engine 124 has determined priorities for students having met the reservation or application deadline and increased any student priorities based on any priority boosting factors as previously mentioned, the matching engine 124 can generate a scholarship queue based on the calculated priorities for such students. In addition, the matching engine 124 can add those students that did not meet the reservation or application deadline to the end of the scholarship queue (e.g., according to respective priorities calculated for those students) or place those students on a separate, lower-priority queue. Such lower-priority students can be prioritized based on their reservation dates, as previously explained. In some cases, such lower-priority students can similarly have their priorities adjusted relative to each other based on one or more factors, as previously described with respect to those students that did meet the reservation or application deadline.

Once the matching engine 124 has calculated or finalized the priorities of all eligible students, the matching engine 124 can match students to scholarships, with students having higher priorities being generally matched with a scholarship before students having lower priorities (e.g., in order based on priorities). However, while students can be generally matched with scholarships in order based on the student priorities calculated, other factors can also affect when a student is matched with a scholarship. For example, in some cases, when submitting an application, a student can include school preferences which can identify a number of schools and/or school systems selected by, or of interest to, that student and define a ranking or priority order for such schools and/or school systems. The scholarship funds for each of those schools or school systems can be obtained from scholarship pools specific to those schools (e.g., school specific scholarship pool) or school systems (e.g., school system specific scholarship pool) or from an undesignated scholarship pool. In some cases, the match of funds to an eligible student from different pools of funds is possible. For example, a scholarship can be provided from a combination of designated and undesignated funds.

Thus, when a student is matched with a scholarship or when a student match is confirmed can depend not only on that student's relative priority within the prioritized queue, but also on the amount of funds available (if any) in the scholarship pool designated for the school(s) and/or school system(s) defined in that student's school preferences, and/or the funds available (if any) in the scholarship pool for undesignated funds. For example, once the matching engine 124 has matched student number nine (9) in the prioritized queue with a scholarship, the matching engine 124 can move down the prioritized queue and try to match student number ten (10) with a scholarship. If student number ten (10) has selected (e.g., via that student's school preferences) school A as a first priority school, school B as a second priority school, and school C as a third priority school, the matching engine 124 can try to match that student with a scholarship for school A, B, or C (e.g., in the order defined in the student's school preferences) depending on whether the scholarship pools designated for those schools have sufficient funds available.

If a scholarship pool designated for one of those schools or an undesignated scholarship pool does have sufficient funds available, the matching engine 124 can match that student with a scholarship for that particular school, with the funds for that scholarship being reserved or obtained from the scholarship pool designated for that school or the undesignated scholarship pool, depending on which pool has the funds available. On the other hand, if none of the scholarship pools designated for schools A, B, and C or the undesignated scholarship pool have sufficient funds available, the matching engine 124 can waitlist that student and move down the prioritized queue to try to match the next student, student number eleven (11), with a scholarship. If the scholarship pool designated for one of the schools or school systems selected by student number eleven (11) in that student's school preferences does have sufficient funds available for a scholarship to the designated school or school system, the matching engine 124 can match that student with a scholarship for that school or school system based on the available funds in the relevant scholarship pool. Accordingly, in this example scenario, student number eleven (11) can be matched with a scholarship before student number ten (10) even though student number eleven (11) has a lower priority in the queue than student number ten (10).

In this way, the matching engine 124 can continue to iterate through the prioritized queue of students, matching students with scholarship or moving ahead in the queue based on student priorities, student school preferences, the amount of funds available in the undesignated scholarship pool and the scholarship pools designated for the schools or school systems defined in the student school preferences, and student eligibility amounts. In some cases, when iterating through the prioritized queue of students, the matching engine 124 can also consider other factors. For example, before matching a student with a scholarship for a particular school or school system, the matching engine 124 can also determine whether that particular school or school system has any slots available/remaining for that student. If the particular school or school system does not have any remaining slots available for that student, the matching engine 124 can try to match that student with a scholarship for another school or school system in the student's school preferences. If none of the schools or school systems in that student's school preferences have a spot available for that student, the matching engine 124 can waitlist that student.

When waitlisted, the student can wait to see if scholarship funds for, and/or a spot at, any of that student's preferred schools or school systems become available, or withdraw from the scholarship program. However, in some cases, the scholarship management system 110 can provide a waitlisted student an option to adjust the student's school preferences to give that student an opportunity to be matched with a scholarship for a different school or school system that may have a designated scholarship pool with sufficient, available funds. In some examples, the scholarship management system 110 can allow a waitlisted student to amend their school preferences while maintaining their place in the prioritized queue. In some cases, when a student amends their school preferences, the scholarship management system 110 can reprioritize the student in the prioritize queue based on the student's new school preferences and/or the fact that the student has modified the initial school preferences. For example, the scholarship management system 110 can increase or decrease the student's priority within the prioritized queue by a certain amount based on the student's amended school preferences.

When a student is waitlisted because none of the scholarship pools of the schools or school systems selected by that student or the undesignated scholarship pool have sufficient funds available for a scholarship to that student, the matching engine 124 can monitor the relevant scholarship pools for any changes in the available of funds. If the matching engine 124 detects any changes in the amount of funds available in one or more of such scholarship pools, the matching engine 124 can again determine whether any of such scholarship pools have sufficient funds available for that student and whether that student can be matched with a scholarship for a selected school. The amount of funds available in a particular scholarship pool can change through the process for a number of reasons. For example, the amount of funds in a particular scholarship pool can change if new funds are added or donated to that scholarship pool, if a student having reserved funds from that scholarship pool withdraws, if an amount of funds reserved for one or more students from that scholarship pool is adjusted (e.g., because of adjustments in tuition/fees for the one or more students), etc.

As previously mentioned, the matching engine 124 can determine whether a student can be matched with a particular scholarship or whether a matched scholarship can be confirmed based on whether there are sufficient funds available for that student's scholarship in one or more applicable scholarship pools (e.g., the undesignated scholarship pool and/or one or more designated scholarship pools). The matching engine 124 can determine whether a scholarship pool has sufficient funds for a student's scholarship based on the amount of available (e.g., unreserved, unallocated, unused, etc.) funds in that scholarship pool and either the eligibility amount calculated for that student or a cost (e.g., tuition/fees) of the school associated with the scholarship pool. In some cases, the matching engine 124 can determine whether a scholarship pool has sufficient funds for a student's scholarship based on the amount of available funds in that scholarship pool and the lesser of the eligibility amount calculated for that student or the cost (e.g., tuition/fees) of the school associated with the scholarship pool.

The cost of a school can be determined based on the cost reported by that school or an associated school system. Moreover, in some cases, the cost of a school can be adjusted for a particular student for one or more reasons. For example, the cost of a school can be adjusted for a student when the student qualifies for a particular educational program, such as IEP, IDEA, ELL, or gifted. The cost of the school can be adjusted to account for any differences in cost resulting from the particular educational program. In another example, the cost of a school can be adjusted for a student if the student receives a discount for that school. Here, the cost can be reduced by the discount amount for that student.

In some cases, some or all of the outputs and/or calculation results generated by the web interface service 120, the processing engine 122 and/or the matching engine 124 can be stored and/or maintained in the data store 130, the accounts store 132, and/or the events store 134. Moreover, some or all of the data used by the web interface service 120, the processing engine 122, and/or the matching engine 124 for their respective functions and/or operations can be obtained from the data store 130, the accounts store 132, and/or the events store 134. In some cases, the web interface service 120, the processing engine 122, and/or the matching engine 124 can communicate with each other to exchange information used to perform their respective functions and/or operations.

The data store 130 in the scholarship management system 110 can store and maintain data associated with one or more scholarship programs managed by the scholarship management system 110. In some examples, the data store 130 can store scholarship and/or scholarship program information, student information, scholarship applications information, school information, school system information, information about scholarship pools, information about scholarship funds, student and school matches, donor information, accounting information, and/or any other related information.

In some examples, scholarship and/or scholarship program information can include, without limitation, scholarship requirements and/or rules, scholarship state/status information, scholarship statistics, scholarship details, and/or any other related information. In some examples, student information can include, without limitation, student biographical data, parent/guardian biographical data, student scholarship eligibility data, student scholarship status information, student school preferences, other student preferences, student academic and/or scholarship progress data, student attendance reports, student placement in one or more scholarship queues, and/or any other relevant information. Moreover, scholarship applications information can include, for example and without limitation, submitted scholarship applications, saved scholarship applications, scholarship applications state data, scholarship application verification results, and/or any other relevant data.

In some examples, school information can include, without limitation, school details (e.g., address, description, etc.), tuition/fees, student slots available, students enrolled, students waitlisted, students withdrawn, school forms, attendance reports, scholarship status information for that school, and/or any other relevant information. School system information can similarly include, for example and without limitation, school system details (e.g., region, schools in a school system, description, etc.), tuition/fees, student slots available for each school and/or school system, students enrolled, students waitlisted, students withdrawn, school forms, attendance reports, scholarship status information for each school and/or school system, payment information, and/or any other relevant information.

Information about scholarship pools can include, for example and without limitation, information about scholarship pools for specific schools, school systems, and/or undesignated scholarship funds. Moreover, information about scholarship funds can include, for example and without limitation, information about available funds associated with one or more scholarship pools, allocated funds associated with one or more scholarship pools, statistics associated with one or more scholarship funds, students and/or schools associated with specific scholarship funds, scholarship funds statistics, and/or any other relevant data. Further, in some examples, student and school matches can include, without limitation, matching results indicating which students have been matched with what schools, state information for student and school matches, and/or any other relevant information.

The accounts store 132 can store accounts registered at the scholarship management system 110 and related information. For example, the accounts store 132 can store student accounts, school accounts, school system accounts, and administrator accounts. In some examples, the accounts store 132 can store accounts for one or more other types of entities, such as scholarship donors, government entities, etc. The accounts can include profile information for registered entities, such as usernames, passwords, contact information, preferences, etc. In some cases, the accounts can also include, or allow associated entities to access, other information which, in some cases, can vary for different types of entities.

For example, depending on the type of account (e.g., student account, school account, school system account, administrator account, etc.), an account can include, and/or provide access to, scholarship and/or scholarship program information, student information, scholarship applications information, school information, school system information, school forms, scholarship eligibility data, information about scholarship pools, information about scholarship funds, student and school matches, donor information, accounting information, account preferences, historical information, state information, etc.

As previously noted, the scholarship management system 110 can optionally include an events store 134. The events store 134 can store events and/or activity data associated with one or more scholarship programs managed by the scholarship management system 110 and/or accounts stored in the accounts store 132. Such events and/or activity data can include, for example and without limitation, application or scholarship expiration events, withdrawals (e.g., student or school withdrawals, etc.), registration events, scholarship award or disbursement events, changes in participation of schools or school systems in one or more scholarship programs, changes to one or more scholarship programs, scholarship adjustments, scholarship eligibility changes, changes in scholarship and/or scholarship rules and/or requirements, termination events (e.g., scholarship program terminations, scholarship terminations, etc.), alerts, etc.

The use of different scholarship pools; the use of granular and/or tiered prioritization logic and/or queues; the use of tiered and/or tailored scholarship eligibility amounts; and/or the use of iterative, fuzzy and/or flexible matching logic herein can provide various benefits over other scholarship systems and programs, such as, for example, increased matching granularity and efficiency; increased flexibility for schools, school systems, students, donors, and administrators; scalability; improved system performance and accuracy; improved scholarship management efficiency; and other benefits. Moreover, these and other features of the technologies herein can allow the scholarship management system 110 to handle/process and manage a very large number of students, funds, scholarship programs, schools and school systems. For example, the scholarship management system 110 can be sufficiently robust to handle/process and manage hundreds, thousands, tens of thousands, etc., of students as well as schools and school systems (local, regional, national, and/or international). As another example, the scholarship management system 110 can handle/process and manage even hundreds of millions of funds for scholarships.

The ability of the scholarship management system 110 to match a wide variety of students with scholarships and schools and school systems can also greatly promote student diversity and inclusion. The scholarship management system 110 can provide students with different backgrounds and economic statuses access to a wide variety of schools and school systems which such students may not otherwise have access to.

Figure 2:
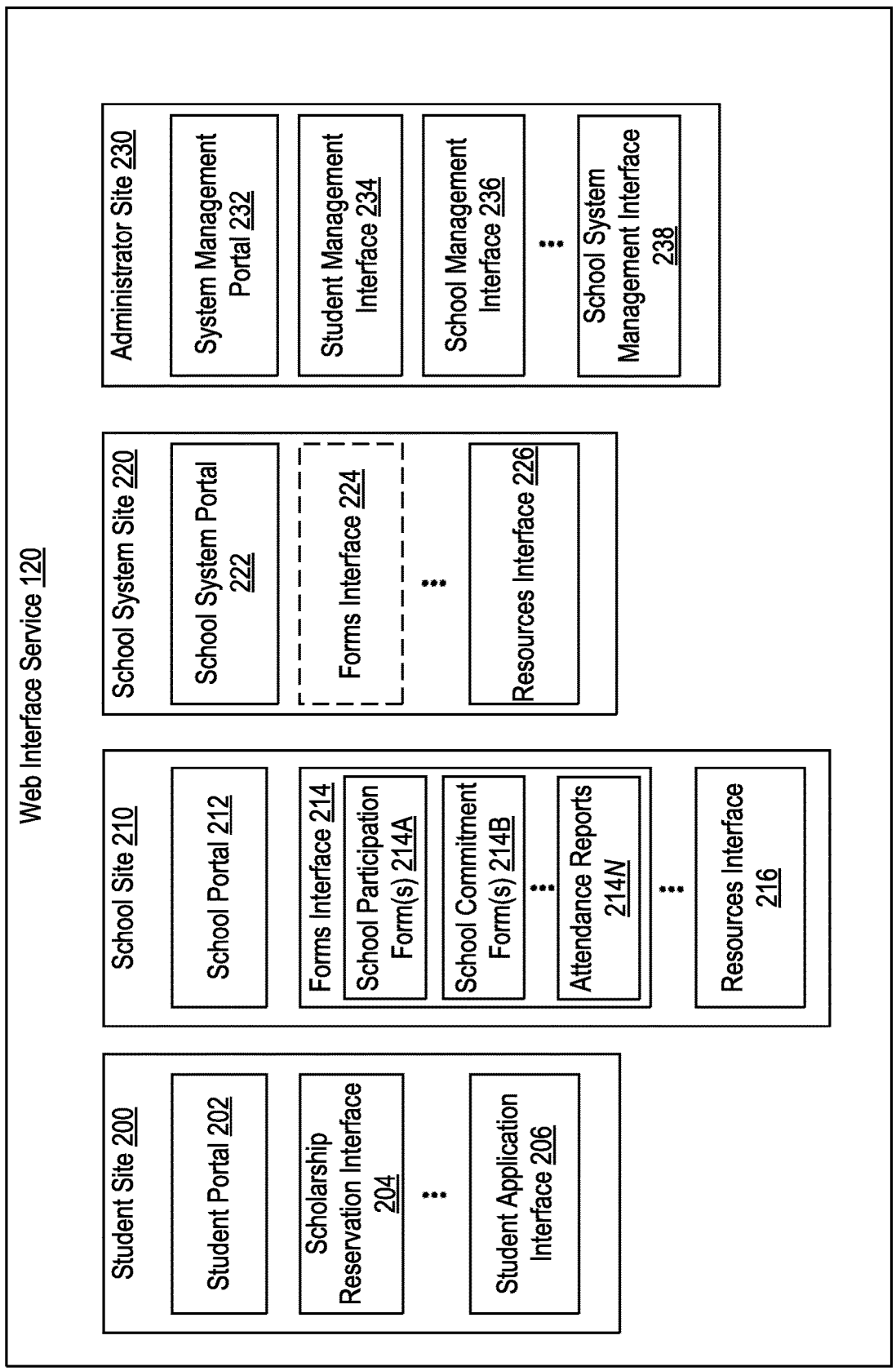
FIG. 2 illustrates an example configuration of a web interface service of a scholarship management system, in accordance with some examples.

FIG. 2 illustrates an example configuration of the web interface service 120 of the scholarship management system 110. In this example, the web interface service 120 includes or hosts a parents and student site 200 ("student site 200" hereinafter), a school site 210, a school system site 220, and an administrator site 230. The student site 200, school site 210, school system site 220, and administrator site 230 can be part of a same website or can be part of one or more separate websites.

The student site 200 can be a site (e.g., a website, part of a website, one or more web pages, etc.) where students check their scholarship eligibility, submit and manage their scholarship applications, access and update their data (e.g., their student information, application data, scholarship data, school data, etc.), manage their scholarships, review and manage student activity and events, and perform any other student-related actions. In some cases, the student site 200 can allow students to submit their scholarship reservations. In other cases, the web interface service 120 can host a separate reservation application where students can submit their scholarship reservations. Students and/or parents/guardians can access the student site 200 from their client device 150 over the network 140 by logging in using a student account registered with the scholarship management system 110.

The student site 200 can include a student portal 202, a scholarship reservation interface 204, and a student application interface 206. The student portal 202 can include information about a student, information about the status of a student's eligibility verification, information about the status of a student's scholarship application, the student's school preferences, the student's priority placement in the system's prioritized queue, the student's scholarship and/or scholarship funds status, progress information, parent/guardian information, etc.

The scholarship reservation interface 204 can be an interface where a student or parent/guardian can complete and submit a reservation request (e.g., a reservation form, reservation information fields, a reservation document, a reservation application, etc.) to obtain a reservation date for a scholarship program. In some cases, the student or parent/guardian can submit such reservation request prior to submitting or initiating a full scholarship application. In other cases, after the student or parent/guardian submits an application for a scholarship, the student will be entered into a lottery system. In some examples, the reservation request can include information identifying the student and indicating an interest in a scholarship program and/or in submitting an application for a scholarship program. For example, the reservation request can include the student's biographical information, the student's address, the school district were the student resides, information about any special educational programs that the student has received or is requesting, an indication that the student wishes to participate in a scholarship program, and/or any other information about the student, the student's parent/guardian, and the student's intent to participate in a particular scholarship program.

The student application interface 206 can allow the student and/or parent/guardian to access a scholarship program application; edit, complete, and/or submit the scholarship application; provide any information, attachments, and/or documentation associated with the scholarship program application such as, for example, income verification documentation, identity documents, etc. In some examples, the student application interface 206 can also allow a student or parent/guardian to view the student's scholarship program application and/or track the student's scholarship program application.

The school site 210 can be a site for schools to access school-related information for one or more scholarship programs. For example, the school site 210 can provide schools access to information about the school, scholarship statistics, scholarship fund statistics, student information, school forms, information about tuition/fees, school profile information such as school contacts, school certification information, donations information, school resources, individual student and/or scholarship information, etc. School administrators or designated employees can access the school site 210 from their client device 150 over the network 140 by logging in using a school account registered with the scholarship management system 110.

The school site 210 can include a school portal 212, a forms interface 204, and a resources interface 216. The school portal 212 can include scholarship statistics (e.g., scholarships awarded, pending, withdrawn, confirmed, reserved, etc.), scholarship fund statistics (e.g., funds available, funds reserved, etc.), student information (e.g., student applications, student status information, list of students matched with the school or a scholarship for that school, waitlisted students, withdrawn students, enrolled students, students who received scholarship awards for that school, students who received funding confirmation, etc.), information about tuition/fees, individual student and/or scholarship information, school eligibility information, etc.

The forms interface 204 can include school-specific forms for one or more scholarship programs. In some examples, the forms interface 204 can include school participation forms 214A, school commitment forms 214B, and attendance reports 214A. The school participation forms 214A can be used by schools to complete and submit school participation agreements for one or more scholarship programs. The school participation agreements can provide the scholarship management system 110 information about the school and the school's intent to participate in one or more scholarship programs. In some examples, the school participation agreement can include school profile information (e.g., the name of the school, the address of the school, grades taught, tuition and fees for each grade taught, programs provided or supported, available student slots per grade, school start and/or end date, etc.), information about tuition and fees (which can be by grade and/or education program), an indication of intent to participate in one or more scholarship programs, a school year to which the school participation agreement is attributed to, etc.

The school commitment forms 214B can be used by schools to confirm scholarship awards for students. In some examples, a school commitment form can include information about a student being confirmed for a scholarship, information about the scholarship being confirmed, the finalized tuition and fees for that student, the school year for the scholarship award, a school certification, and/or any other information about the school's commitment to participate in the scholarship program and/or serve/accept a matched student/scholarship.

The attendance reports 214N can be used by schools to verify a scholarship recipient's attendance in a particular school year. This information can be used by the scholarship management system 110 to verify a student's compliance with attendance requirements associated with a scholarship program. An attendance report can include, for example and without limitation, a school year associated with the attendance report, a student and/or student application associated with the attendance report, the value of the student's scholarship for the defined period of time of the attendance record, a student's attendance record during a particular period (e.g., year, semester, quarter, half, etc.) associated with the attendance report, a student's enrollment status, a particular period (e.g., year, semester, quarter, half, etc.) to which the student's enrollment status pertains, a submission data, and/or any other attendance information.

The resources interface 216 can provide schools access to various school resources. Non-limiting examples of school resources that may be accessible through the resources interface 216 can include school certification resources (e.g., documents, instructions, statistics, links, forms, attachments, submission tools, export tools, etc.), donation resources (e.g., documents, attachments, statistics, submission tools, export tools, donor contact resources, etc.), documentation, school profile information, and/or any other school resources.

The school system site 220 can be a site for school systems to access school system related information for one or more scholarship programs. For example, the school system site 2120 can provide school systems access to information about the school system, the schools in the school system, scholarship statistics (e.g., by school system and/or school), scholarship fund statistics, student information (e.g., by school system and/or school), school forms (e.g., by school system and/or schools), information about tuition/fees (e.g., by school system and/or school), school system profile information, school system certification information, donations information, school system resources, individual student and/or scholarship information, individual school information, etc. School system administrators or designated employees can access the school system site 220 from their client device 150 over the network 140 by logging in using a school system account registered with the scholarship management system 110.

The school system site 220 can include a school system portal 222, a forms interface 224, and a resources interface 226. The school system portal 222 can include scholarship statistics for the school system and/or schools within the school system, scholarship fund statistics for the school system and/or schools within the school system, student information for the school system and/or schools within the school system, information about tuition/fees for the school system and/or schools within the school system, individual student and/or scholarship information for the school system and/or schools within the school system, school system eligibility information, etc.

The forms interface 224 can include school system forms for one or more scholarship programs. The school system forms can include forms specific to the school system and/or schools within the school system. In some examples, the forms interface 224 can include school participation forms, school commitment forms, and attendance reports, as previously described.

The resources interface 226 can provide school systems access to various school system resources. Non-limiting examples of school system resources that may be accessible through the resources interface 226 can include school system certification resources, donation resources, documentation, school system profile information, school profile information for schools in the school system, and/or any other school system resources.

The administrator site 230 can be a site for system administrators (e.g., administrators of the scholarship management system 110 and/or scholarship programs) to access system, school, school system, scholarship, and scholarship program information. For example, the administrator site 230 can allow administrators to view/access, edit, process, verify, and manage school information, school system information, student information, scholarship information, donor information, donations, scholarship funds, forms (e.g., school forms, school system forms, system forms, scholarship forms, program forms, etc.), information about tuition/fees, school and/or school system certification information, resources, comments, information about districts, information about education programs, student-scholarship matches, awards, invite requests, applications (e.g., processed, pending, accepted/verified, completed, etc.), reports, commitments, agreements, users, yearly data rules, statistics, etc.

In some examples, the administrator site 230 can also provide tools for sending messages and/or alerts, sending invitations (e.g., to students, schools, school systems, scholarship programs, donors, etc.), importing and/or exporting content items such as, for example, reports, statistics, documentation, forms, donations, yearly data rules, etc. Administrators or designated users can access the administrator site 230 from their client device 150 by logging in using an administrator account registered with the scholarship management system 110.

The administrator site 230 can include a system management portal 232, a student management portal 234, a school management portal 236, and a school system management portal 238. The system management portal 232 can allow administrators to manage data and features of the scholarship management system 110 and/or scholarship programs managed by the scholarship management system 110. For example, the system management portal 232 can allow administrators to manage user accounts, troubleshoot issues, manage schools in the system, manage school systems in the system, manage students in the system, manage resources in the system, manage scholarship programs, import and export data, manage scholarship program requirements, verify information, process information, manage scholarship pools, manage priority queues, etc.

The student management portal 234 can allow administrators to access and/or manage student information, such as student biographical details, parent/guardian information, student scholarship information, student application information, student eligibility information, student status information (e.g., application status, scholarship status, enrollment status, award status, etc.), student school or school system information, student verification information, student requirements, student activity, student matches, student funding information, student eligibility information, student related issues, and/or any other student related information.

The school management portal 236 can allow administrators to access and/or manage school information, such as school profiles (e.g., address, name, education programs, number of students served, grades supported, tuition/fees, etc.), scholarship information for schools (e.g., scholarship statistics, scholarship status information, scholarship details, etc.), information about students associated with the schools (e.g., matched students, enrolled students, waitlisted students, withdrawn students, scholarship recipients, funding information, etc.), school eligibility information, school status information (e.g., certification status, scholarship statuses, enrollment statuses, award statuses, funding statuses, commitment statuses, agreement statuses, eligibility status, participation status, etc.), school requirements, school activity, school-student-scholarship matches, school related issues, school resources, school forms, and/or any other school related information.

The school system management portal 238 can allow administrators to access and/or manage school system information, such as school system profiles (e.g., address, name, education programs, list of schools, number of students served, grades supported, tuition/fees, etc.), scholarship information for school systems (e.g., scholarship statistics, scholarship status information, scholarship details, etc.), information about students associated with the school systems (e.g., matched students, enrolled students, waitlisted students, withdrawn students, scholarship recipients, funding information, etc.), school system eligibility information, school system status information (e.g., certification status, scholarship statuses, enrollment statuses, award statuses, funding statuses, commitment statuses, agreement statuses, eligibility status, participation status, etc.), school system requirements, school system activity, school system-student-scholarship matches, school system related issues, school system resources, school system forms, and/or any other school system related information.

While FIG. 2 shows various sites, interfaces, and components of the web interface service 120, it should be noted that such sites, interfaces, and components are non-limiting examples provided for clarity and explanation purposes. One of ordinary skill in the art will recognize that the web interface service 120 can include more or less sites, interfaces, and/or components than those shown in FIG. 2, as well as different sites, interfaces, and components that are not shown in FIG. 2 such as, for example, donor sites, government agency sites, etc.

Figure 3A:
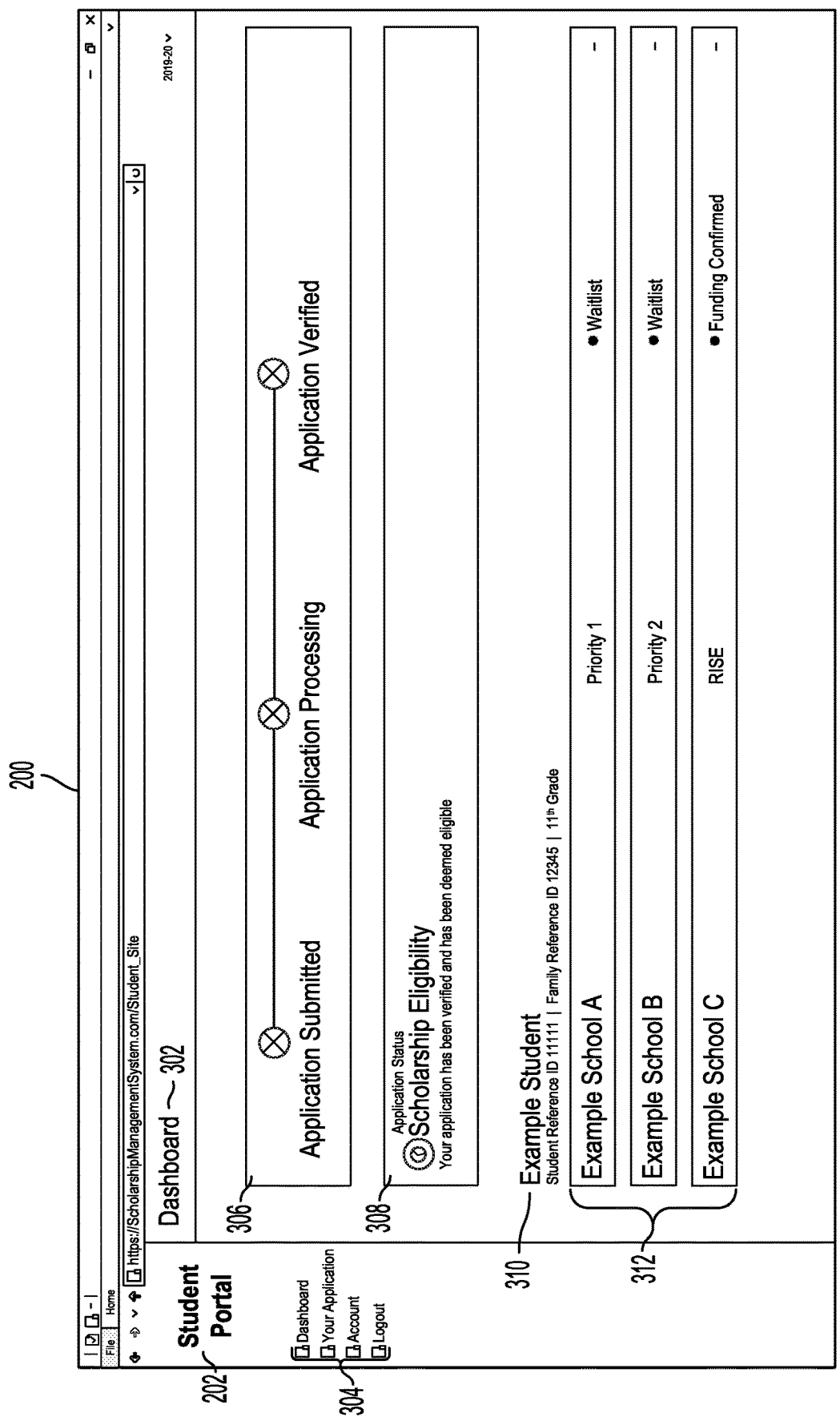
FIG. 3A illustrates an example student site hosted by a web interface service of a scholarship management system, in accordance with some examples.

FIG. 3A illustrates an example of a student site 200 hosted by the web interface service 120 of the scholarship management system 110. The student site 200 can include a menu 304 of items available from the student site 200. In this example, the menu 304 includes a link to a dashboard 302 on the student portal 202 of the student site 200, a link to the student's application, a link to access the student's account information, and a logout option.

In this example, the student site 200 depicts an example view of a dashboard 302 on the student portal 202 of the student site 200. The dashboard 302 can include an application status section 306, which can indicate a status and/or progress of a scholarship application associated with the logged in student. The status and/or progress can include, for example, whether the scholarship application has been submitted, processed, and/or verified.

The dashboard 302 can also include a scholarship eligibility section 308. The scholarship eligibility section 308 can provide scholarship eligibility status information, such as whether the student's application has been verified and/or deemed eligible for a scholarship. Moreover, the dashboard 302 can include student information 310, such as the student's name, the student's reference identifier in the system, the student's family identifier in the system, the student's grade, the student's address, etc.

The dashboard 302 can also include a school preferences section 312 associated with the student. The school preferences section 312 can identify the schools and/or school systems selected by the student for the scholarship program, the rankings or priorities defined by the student for those schools and/or school systems, and status information for each school or school system. The status information can include, for example, whether the student is waitlisted for a scholarship and/or a particular school or school system, whether a conditional scholarship award (e.g., a scholarship award that has been offered/sent to a student and is pending an award acceptance or declination from the student) has been sent, whether a conditional scholarship award has been reserved or confirmed by the student, whether funding has been reserved and/or confirmed, whether the student has withdrawn from the scholarship program and/or the school or school system, whether a scholarship or an application has expired (e.g., because of inaction by the student or parent/guardian before a deadline), etc.

Figure 3B:
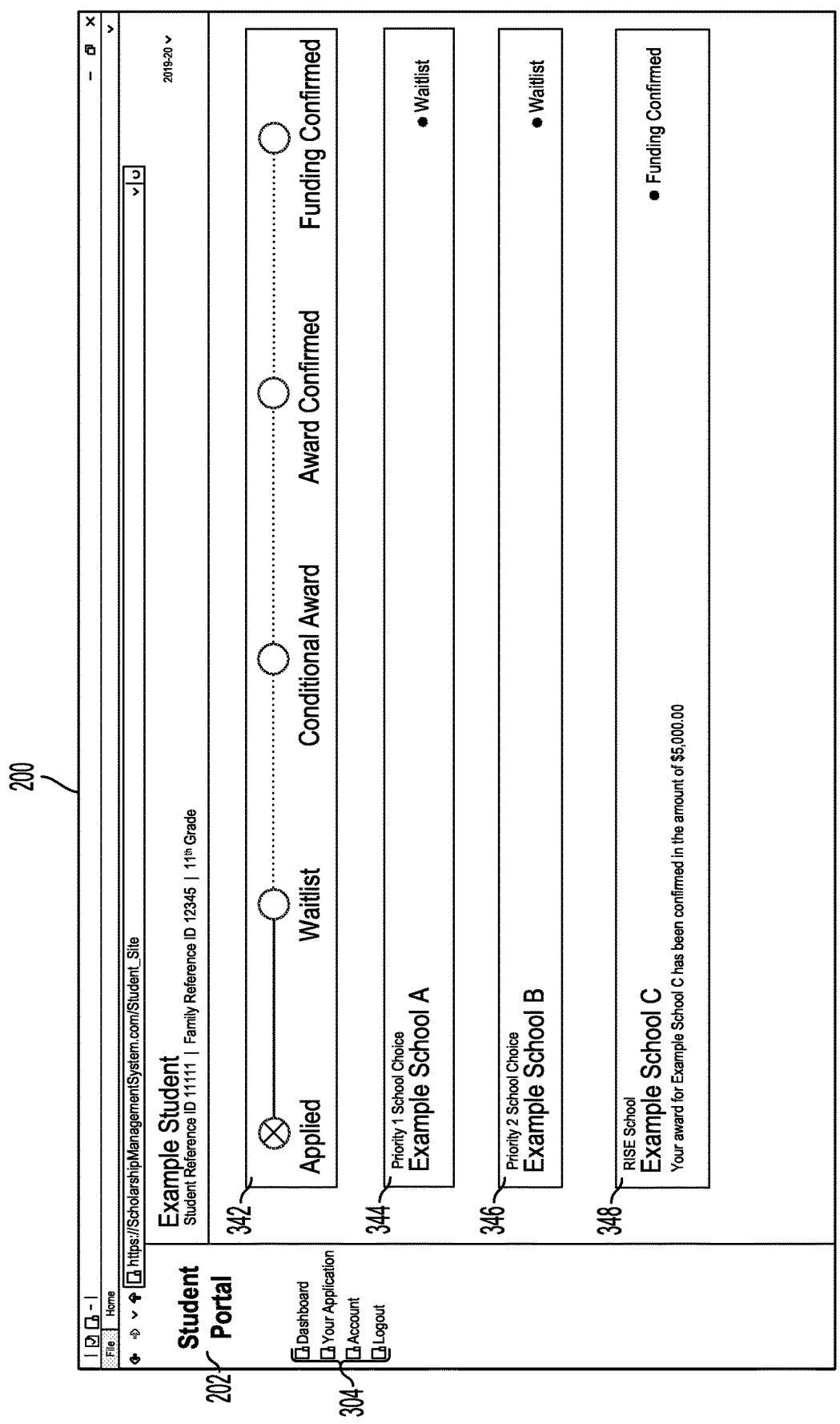
FIG. 3B illustrates a view of a student portal of a student site hosted by a web interface service of a scholarship management system, in accordance with some examples.

FIG. 3B illustrates a different view of the student portal 202 of the student site 200. In this example, the student portal 202 shows a breakdown of scholarship details for an individual student. The breakdown can include a scholarship status section 342 that a status and progress of a student's scholarship application lifecycle.

The status and progress details can include, for example, whether the student has applied for a scholarship, whether the student has been waitlisted at a matched school, whether the student has received a conditional award, whether the student has received an award confirmation, and whether the student has received funding confirmation. In some examples, the status and progress details can include more or less granular details. For example, in some cases, the status and progress details can include details about other states in a scholarship lifecycle, such as a payment status, etc.

The student portal 202 can also include school details 344-348 for each of the student's school choices. For example, school details section 344 can provide information about the first priority school or school system selected by the student, such as the name of the school or school system, the selected priority of the school or school system, a progress status for that school or school system (e.g., waitlisted, conditional award, award confirmed, funding confirmed, etc.), etc. Similarly, school details section 346 can provide information about a second priority school or school system selected by the student, such as the name of the school or school system, the selected priority of the school or school system, a progress status for that school or school system (e.g., waitlisted, conditional award, award confirmed, funding confirmed, etc.). School details section 348 can provide information about a third priority school or school system selected by the student, such as the name of the school or school system, the selected priority of the school or school system, a progress status for that school or school system (e.g., waitlisted, conditional award, funding confirmed, award confirmed, etc.), a scholarship amount confirmed for that school or school system, a type of school program associated with that school or school system (e.g., Tax Credit Scholarship, various forms of non-Tax Credit Scholarship, etc.), etc.

In some examples, the student can click or select a specific school details section (e.g., 344, 346, 348) and/or school identified in a specific school details section to view additional details for that school or school system and/or edit details associated with that school or school system. Moreover, while FIG. 3B shows three (3) school choices, it should be understood that this is provided as an illustrative example for explanation purposes, and other examples may include more or less school choices.

Figure 4A:
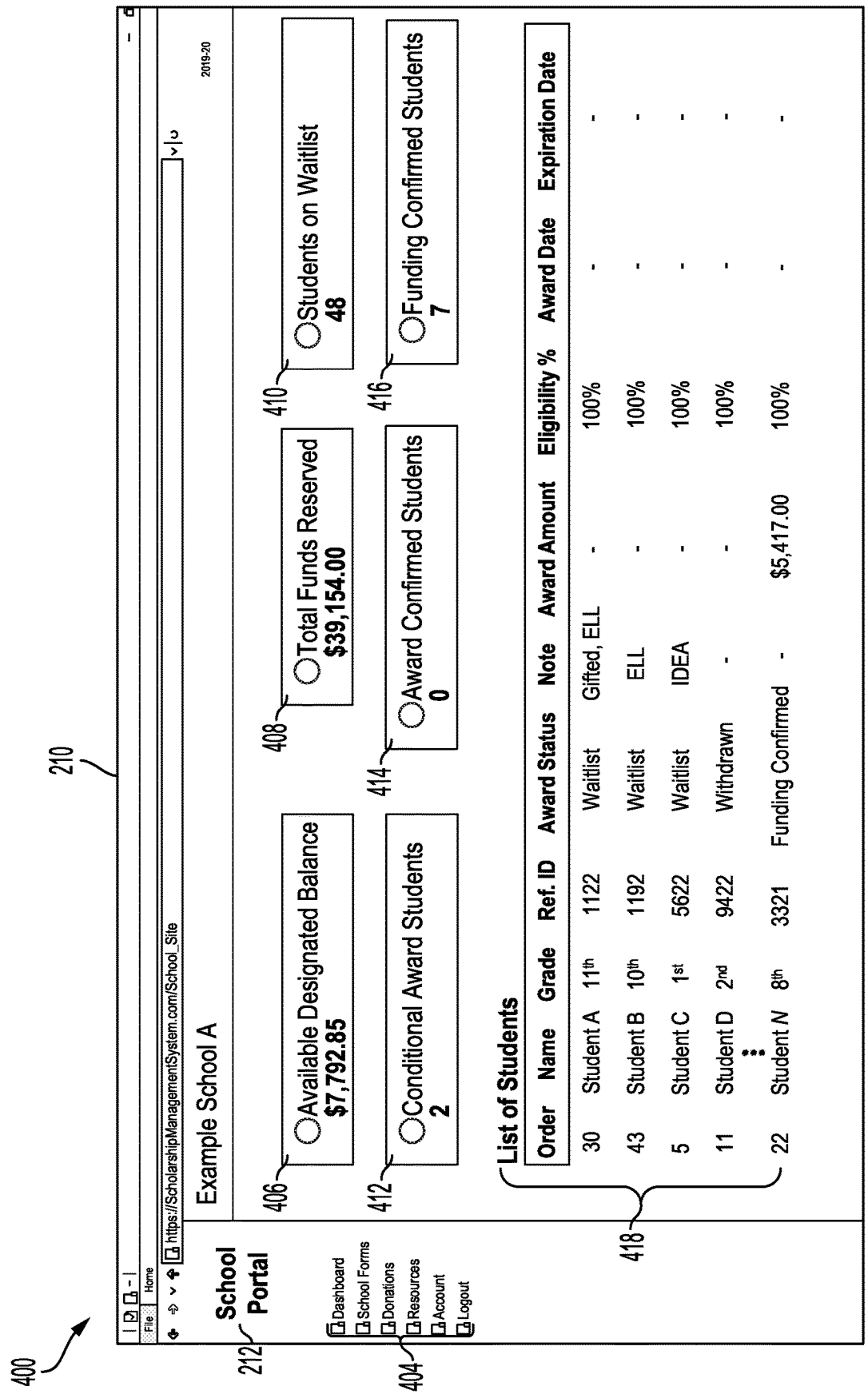
FIG. 4A illustrates an example view of a school portal on a school site hosted by a web interface service of a scholarship management system, in accordance with some examples.

FIG. 4A illustrates an example view 400 of a school portal 212 on a school site 210 hosted by the web interface service 120 of the scholarship management system 110. The school portal 212 can include a menu 404 of items available from the school portal 212. In this example, the menu 404 includes a link to a dashboard on the school site 210, a link to access forms associated with that school, a link to access donations associated with that school, a link to resources associated with that school, a link to access the school's account information, and a logout option.

The school portal 212 can include various scholarship details sections 406-416 for that school. In this example, the scholarship details sections 406-416 can include a scholarship funds balance section 406, a reserved funds section 408, a waitlisted students section 410, a conditional awards section 412, a confirmed awards section 414, and a confirmed funding section 416.

The scholarship funds balance section 406 can indicate an amount of funds available in the designated scholarship pool for that particular school. The reserved funds section 408 can indicate the total amount of funds reserved for scholarships/students for that school. The waitlisted students section 410 can indicate how many students are waitlisted at that school. The conditional awards section 412 can indicate how many students have received a conditional scholarship award for that school. The confirmed awards section 414 can indicate how many students have confirmed a conditional scholarship award for that school. The confirmed funding section 416 can indicate how many students have received scholarship funding confirmation for that school. In some cases, funding can be confirmed after a school confirms that the student is enrolled and the exact tuition and costs.

The school portal 212 can also include a student details section 418. The student details section 418 can provide a list of students that have selected that particular school as a school choice for a scholarship and/or have been matched with that school by the scholarship management system 110. The list of students in the student details section 418 can provide information about each student (e.g., name, grade, reference identifier, education program for that student, priority order of that student, parent/guardian contact information, etc.), scholarship award information for that student, etc.

In some examples, the scholarship award information provided for a student can include, without limitation, an award status for that student (e.g., waitlist, withdrawn, conditional scholarship award, scholarship award confirmed, funding confirmed, etc.), a scholarship award amount if a scholarship award and/or funding has been confirmed for that student, a scholarship eligibility state, a scholarship award date if an award has been confirmed/allocated, a scholarship expiration date, etc.

Figure 4B:
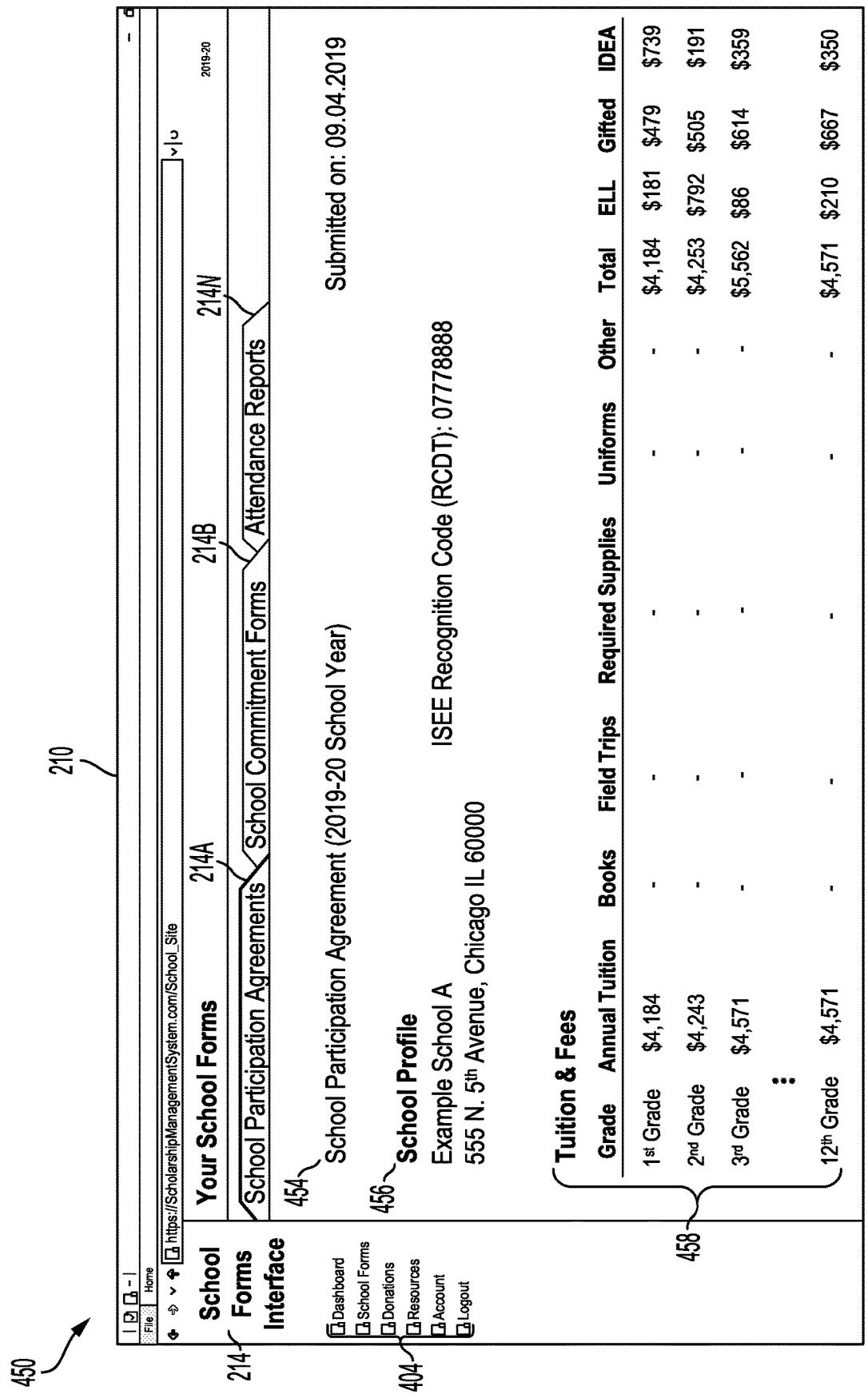
FIG. 4B illustrates an example view of a school forms interface on a school site hosted by a web interface service of a scholarship management system, in accordance with some examples.

FIG. 4B illustrates an example view 450 of a school forms interface 214 on the school site 210 hosted by the web interface service 120. In this example, the school forms interface 214 includes tabs for accessing school participation agreements 214A of a particular school, school commitment forms 214B of that school, and attendance reports 214N from that school.

This example view 450 shows the contents displayed when the school participation agreements 214A tab is accessed. In particular, view 450 depicts an example school participation agreement for the school. The school participation agreement includes identification information 454 associated with the school participation agreement. The identification information 454 can include, for example and without limitation, an indication that the displayed form is a school participation agreement, an indication of the school year associated with the school participation agreement, and a submission date.

The school participation agreement also includes a profile section 456 that includes a school profile. The school profile can include various school details such as, for example, a name of the school, an address of the school, an independent school entrance examination (ISEE) code associated with the school, a unique identifier associated with the school, a description of the school, and/or any other information about the school.

The school participation agreement can also include cost section 458 which details the school's tuition and fees for each grade. The tuition and fees can include the annual tuition for each grade, costs for books (if any), costs for field trips (if any), costs for required supplies (if any), costs for uniforms (if any), any other costs, a total amount of the tuition and fees for each grade, and any additional costs for any specific education programs such as ELL, gifted, IDEA, etc.

FIG. 5 illustrates an example configuration of a school system portal 222 on a school system site 220 hosted by the web interface service 120 of the scholarship management system 110. The school system portal 222 can include a menu 504 of items available from the school portal 222. In this example, the menu 504 includes a link to a dashboard on the school system site 220, a link to access donations associated with that school system, a link to access scholarship awards associated with that school system, a link to access forms associated with that school system, a link to resources associated with that school system, a link to access the school system's account information, and a logout option.

The school system portal 222 can include a schools section 506 identifying each school in the school system and scholarship status information for each school. For example, the schools section 506 can include the name of each school in the school system, the number of applicants for each school, the number of waitlisted applicants at each school, the number of applicants having a conditional award state, the number of applicants having a confirmed award state, the number of applicants having confirmed funding, the number of applicants having other award states, and an amount of funds awarded for applicants at each school.

In some examples, each item listed in the schools section 506 can be selectable to allow a user to drill down on that item and obtain additional details for that item. For example, a user can click on a school to see additional details about that school. As another example, a user can click on the number of applicants displayed for a school to see additional details such as the specific applicants and associated information. In this way, the schools section 506 can provide an overview of school and scholarship related information, but can allow users to obtain more granular details for any information provided in the schools section 506.

FIG. 6 illustrates an example dashboard 602 presented from the administrator site 230. In some examples, the dashboard 602 can be part of the system management portal 232 of the administrator site 230 or accessed from the system management portal 232.

The dashboard 602 can include a file upload section 604 where administrators can upload files, documents, and information. In this example, the file upload section 604 can be used to import a file containing a list of donations received for one or more scholarship programs. The list of donations can include, for example, a list of donors, respective donation amounts, whether each donation has a designated school or school system or is otherwise undesignated, and/or any other relevant information.

The dashboard 602 can also include a school agreements section 606 identifying the number of school participation agreements completed for one or more scholarship programs and a school commitments section 608 identifying the number of school commitment forms completed for one or more scholarship programs.

The dashboard 602 can include a total donations section 610 and a donation balances section 612. The total donations section 610 can identify the total amount of designated school donations, the total amount of school system donations, the total amount of undesignated donations, and the total amount of donations, including designated, undesignated, and school system donations. The donation balances section 612 can include cumulative donation balances for designated school donations, school system donations, undesignated donations, and the total donations, including designated, undesignated, and school system donations.

The dashboard 602 can also include an awards section 614 identifying scholarship awards information for the current school year. The scholarship awards information in the awards section 614 can include a number of conditional awards for the current school year, a number of confirmed awards for the current school year, and the number of fundings confirmed for the current school year. In some examples, the scholarship awards information in the awards section 614 can also include the total monetary amount of the conditional awards for the current school year, the total monetary amount of the confirmed awards for the current school year, and the total monetary amount of the fundings confirmed for the current school year.

FIG. 7 illustrates a flowchart 700 of an example process for managing scholarship programs. The steps outlined in the flowchart 700 are provided as examples and can be implemented in any combination thereof, including combinations that exclude, add, or modify certain steps. For the sake of clarity and explanation purposes, the steps in the flowchart 700 are described with reference to the scholarship management system 110 configured to perform the various steps. Moreover, in some examples, the example process in flowchart 700 and/or one or more steps in the flowchart 700 can be performed one or more times within a specific period of time such as a year. In other examples, the example process in flowchart 700 and/or one or more steps in the flowchart 700 can be performed continuously, on an ongoing basis.

At step 702, the scholarship management system 110 can receive scholarship donations for one or more scholarship programs. The scholarship donations can include donations designated for specific schools, donations designated for specific school systems, and/or undesignated donations. In some examples, the scholarship management system 110 can assign each donation to a specific scholarship pool depending on the donation's designation or lack thereof.

For example, the scholarship management system 110 can put a donation designated for a school into a scholarship pool for such designated donations. The scholarship management system 110 can similarly put a donation designated for a school system into a different scholarship pool for such school system donations. The scholarship system 110 can also put any undesignated donations into a separate scholarship pool for undesignated donations. The various scholarship donation pools can be used to match students with scholarships as described herein.

At step 704, the scholarship management system 110 can receive school participation agreements from one or more schools and/or one or more school systems. The school participation agreement from a particular school or school system can define the tuition and costs for that particular school or school system. In some examples, the tuition and costs defined in a school participation agreement can include tuition and costs for each grade, and the costs can be broken down by cost item. The tuition and cost information from the school participation agreements can be used to manage scholarships as described herein.

In some cases, the school participation agreement of a school can be provided, submitted, or imported by the school via the school site 210. Similarly, the school participation agreement of a school system can be provided, submitted, or imported by the school system via the school system site 220.

At step 706, the scholarship management system 110 can receive student reservations. In some examples, the scholarship management system 110 can receive the student reservations through the student site 200. For example, each student can submit a reservation via the student site 200. The student reservations can reserve a spot for the students in one or more scholarship programs managed by the scholarship management system 110. Moreover, the student reservations can generate a reservation timestamp for each student, which can be used to calculate student scholarship priorities and place students in a prioritized queue for matching students to scholarships, as described herein.

At step 708, the scholarship management system 110 can receive student applications for scholarships from one or more scholarship programs managed by the scholarship management system 110. The student applications can include identifying information about the student, identifying information about the student's parent/guardian, contact information, the student's address, the student's school district, the student's household income for determining scholarship eligibility and/or prioritization, school preferences, and/or any other relevant student and/or scholarship information.

The school preferences provided in a student's scholarship application can include a number of choice schools and/or school systems selected by the student. The school preferences can also rank or prioritize each school or school system. For example, a student can assign priorities to each selected school and/or school system based on the student's preferences and/or any other criteria.

At step 710, the scholarship management system 110 can match students to scholarships and schools (e.g., via the matching engine 124), and at step 712, the scholarship management system 110 can determine if there are enough funds available for the matched scholarships. If the scholarship management system 110 determines that there are not enough funds available for a student's scholarship, the scholarship management system 110 can waitlist the student at step 714. On the other hand, if the scholarship management system 110 determines that there are enough funds available for the student's scholarship, the scholarship management system 110 can verify the student's eligibility status at step 718.

Returning to step 710, the scholarship management system 110 can match students to scholarships and schools based on the student reservations, the student applications, student priorities, and/or whether there are sufficient scholarship funds available for that matched student and school or school system. In some examples, the scholarship management system 110 can match eligible students to scholarships (or scholarship funds) for schools based on one or more factors such as, for example, student preferences (e.g., from the students' applications), student priority queues, student eligibility amounts, school costs (e.g., tuition/fees and any applicable adjustments), available scholarship funds, available school slots, etc. For example, in some cases, the scholarship management system 110 can maintain different pools for different scholarship funds, which it can use, along with other factors as described herein, to match students to scholarships based on the funds available at one or more applicable scholarship fund pools.

The scholarship management system 110 can calculate priority queues or classifications for students in the system and match students to scholarship funds in particular scholarship pools based on the students' respective places in the priority queues or classifications, the amount of available funds (if any) in any scholarship pools applicable to such students (e.g., the scholarship pools associated with any schools and/or school systems selected by the student), the students' eligibility amounts, the costs associated with the students' preferred schools, and/or the number of open slots at the various schools or school systems selected by the students.

To calculate priority queues for students, the scholarship management system 110 can consider a number of factors such as, for example, a student's reservation date, the school(s) a student applied to, a student's household income, the particular district where the student resides, whether the student or a family member has received a scholarship award in the particular scholarship program, etc. In some examples, the scholarship management system 110 can assign students an initial priority based on their respective reservation dates. In some cases, the scholarship management system 110 can then increase or decrease the initial priorities based on one or more other factors such as, for example, household income, the district where the student resides, whether the student or a family member has previously received a scholarship through the scholarship program, etc.

In some cases, the scholarship management system 110 can place students in different, tiered priority queues. For example, in some cases, the scholarship management system 110 can prioritize students who obtain a reservation date before a reservation or application deadline for the applicable school year based on their respective reservation dates (e.g., earlier dates can receive a higher priority than later dates and/or can be placed in a higher priority queue). On the other hand, the scholarship management system 110 can assign a lower priority to students who obtain a reservation date that is after the reservation or application deadline for that school year or place them in a separate, lower-priority queue.

Moreover, in some cases, in addition to prioritizing students based on reservation dates, the scholarship management system 110 can further prioritize students based on one or more other factors, such as a student's household income, the particular district where the student resides, whether the student or a family member has received a scholarship from the scholarship program, etc. For example, the scholarship management system 110 can prioritize students who did obtain a reservation before the reservation or application deadline based on their respective reservation dates. The scholarship management system 110 can then identify any students having a household income below a threshold, and increase the respective priorities of those students by a certain amount. The scholarship management system 110 can also identify any students residing in one or more particular school districts that are configured to boost a student's priority (e.g., school districts with low academic performance such as Focus and/or priority districts), and increase the respective priorities of those students by a certain amount. For any students having received a scholarship from the scholarship program in a previous year or having a family member that has received a scholarship through a scholarship program managed by the scholarship management system 110, the scholarship management system 110 can similarly increase their respective priorities by a certain amount.

In some cases, the scholarship management system 110 can also prioritize students and/or adjust student priorities based on different tiers of household incomes. For example, students can be assigned initial priorities based on their respective reservation dates. The students' priorities can then be adjusted based on their respective household incomes. Here, a student in a lower household income tier (e.g., a tier having a lower household income threshold) can be given a higher priority boost than a student in a higher income tier (e.g., a tier having a higher household income threshold than the lower household income tier). The number of household income tiers can vary in different implementations.

In some examples, the scholarship management system 110 can also readjust student priorities or a student's placement in a prioritized queue after an initial calculation/processing of student priorities and/or a subsequent adjustment of student priorities. For example, the scholarship management system 110 can determine an updated household income associated with a student and can confirm the priority of the student or move the student to another priority if the student's updated, verified household income corresponds to a different tier of household incomes.

Once the scholarship management system 110 has determined priorities for students having met the reservation or application deadline and adjusted any student priorities based on any priority adjustment factors as previously mentioned, the scholarship management system 110 can generate one or more scholarship queues based on the calculated priorities for such students. The scholarship management system 110 can add those students that did not meet the reservation or application deadline to the end of a scholarship queue (e.g., according to respective priorities calculated for those students) or place those students on a separate, lower-priority queue. Such lower-priority students can be prioritized based on their reservation dates, as previously explained. In some cases, such lower-priority students can also have their priorities adjusted relative to each other based on one or more factors, as previously described with respect to those students that did meet the reservation or application deadline.

Once the scholarship management system 110 has calculated or finalized the priorities of students, the scholarship management system 110 can match students to scholarships for specific schools or school systems, with students having higher priorities being generally matched with a scholarship before students having lower priorities (e.g., in order based on priorities). However, while students can be generally matched with scholarships in order based on the student priorities or queues calculated, other factors can also affect when a student is matched with a scholarship. For example, in some cases, a student's application can identify a number of schools and/or school systems selected by, or of interest to, that student and define a ranking or priority order for such schools and/or school systems. The scholarship funds for each of those schools or school systems can be obtained from scholarship pools specific to those schools (e.g., school specific scholarship pool) or school systems (e.g., school system specific scholarship pool) or from an undesignated scholarship pool.

Thus, in some cases, when a student is matched with a scholarship or when a student match is confirmed can depend not only on that student's relative priority within the prioritized queue, but also on the amount of funds available (if any) in the scholarship pool designated for the school(s) and/or school system(s) defined in that student's school preferences, and/or the funds available (if any) in the scholarship pool for undesignated funds. For example, once the scholarship management system 110 has matched a higher priority student number in the prioritized queue with a scholarship, the scholarship management system 110 can move down the prioritized queue and try to match the next student in the queue with a scholarship. If the higher priority student has selected (e.g., via that student's school preferences) school A as a first priority school, school system B as a second priority school, and school C as a third priority school, the scholarship management system 110 can try to match that student with a scholarship for school A, school system B, or school C (e.g., in the order defined in the student's school preferences) depending on whether the scholarship pools designated for the schools and school system have sufficient funds available.

If a scholarship pool designated for one of the schools, the school system, or an undesignated scholarship pool does have sufficient funds available, the scholarship management system 110 can match that student with a scholarship for that particular school or school system, with the funds for that scholarship being reserved or obtained from the scholarship pool designated for that school or school system or the undesignated scholarship pool, depending on which pool has the funds available. On the other hand, if none of those scholarship pools have sufficient funds available, the scholarship management system 110 can waitlist that student and move down the prioritized queue to try to match the next student with a scholarship. If the scholarship pool designated for one of the schools or school systems selected by the next student does have sufficient funds available for a scholarship to a designated school or school system, the scholarship management system 110 can match that student with a scholarship for that school or school system based on the available funds in the relevant scholarship pool. Accordingly, in this example scenario, that student can be matched with a scholarship before the higher priority student number even though that student has a lower priority in the queue than the higher priority student.

The scholarship management system 110 can continue to iterate through the prioritized queue of students, matching students with scholarship or moving ahead in the queue based on student priorities, student school preferences, the amount of funds available in the undesignated scholarship pool and the scholarship pools designated for the schools or school systems defined in the student school preferences, student eligibility amounts, etc. In some cases, when iterating through the prioritized queue of students, the scholarship management system 110 can also consider other factors. For example, before matching a student with a scholarship for a particular school or school system, the scholarship management system 110 can determine whether that particular school or school system has any slots available/remaining for that student. If the particular school or school system does not have any remaining slots available for that student, the scholarship management system 110 can try to match that student with a scholarship for a lower-priority school or school system in the student's school preferences. If none of the schools or school systems in that student's school preferences have a spot available for that student, the scholarship management system 110 can waitlist that student.

When waitlisted, the student can wait to see if scholarship funds for, and/or a spot at, any of that student's preferred schools or school systems become available, or withdraw from the scholarship program. However, in some cases, the scholarship management system 110 can provide a waitlisted student an option to adjust the student's school preferences to give that student an opportunity to be matched with a scholarship for a different school or school system that may have a designated scholarship pool with sufficient, available funds. In some examples, the scholarship management system 110 can allow a waitlisted student to amend their school preferences while maintaining their place in the prioritized queue. In other examples, the scholarship management system 110 can deprioritize a student that amends their school preferences by a certain amount.

When a student is waitlisted because none of the scholarship pools of the schools or school systems selected by that student or the undesignated scholarship pool have sufficient funds available for a scholarship to that student, the scholarship management system 110 can monitor the relevant scholarship pools for any changes in the available of funds. If the scholarship management system 110 detects any changes in the amount of funds available in one or more of such scholarship pools, the scholarship management system 110 can again determine whether any of such scholarship pools have sufficient funds available for that student and whether that student can be matched with a scholarship for a selected school. The amount of funds available in a particular scholarship pool can change through the process for a number of reasons. For example, the amount of funds in a particular scholarship pool can change if new funds are added or donated to that scholarship pool, if a student having reserved funds from that scholarship pool withdraws, if an amount of funds reserved for one or more students from that scholarship pool is adjusted (e.g., because of adjustments or discounts in tuition/fees for the one or more students), etc.

As previously mentioned, the scholarship management system 110 can determine whether a student can be matched with a particular scholarship or whether a matched scholarship can be confirmed based on whether there are sufficient funds available for that student's scholarship in one or more applicable scholarship pools (e.g., the undesignated scholarship pool and/or one or more designated scholarship pools). The scholarship management system 110 can determine whether a scholarship pool has sufficient funds for a student's scholarship based on the amount of available (e.g., unreserved, unallocated, unused, etc.) funds in that scholarship pool, the eligibility amount calculated for that student and/or a cost (e.g., tuition/fees) of the school associated with the scholarship pool. In some cases, the scholarship management system 110 can determine whether a scholarship pool has sufficient funds for a student's scholarship based on the amount of available funds in that scholarship pool and the lesser of the eligibility amount calculated for that student or the cost (e.g., tuition/fees) of the school associated with the scholarship pool.

The cost of a school can be determined based on the cost reported by that school or an associated school system in the school participation agreement received from that school. Moreover, in some cases, the cost of a school can be adjusted for a particular student for one or more reasons. For example, the cost of a school can be adjusted for a student when the student qualifies for a particular educational program, such as IEP, IDEA, ELL, or gifted. The cost of the school can be adjusted to account for any differences in cost resulting from the particular educational program. In another example, the cost of a school can be adjusted for a student if the student receives a discount for that school. Here, the cost can be reduced by the discount amount for that student.

Returning to step 718, if the scholarship management system 110 determines that a student is not eligible for a scholarship, at step 720 the scholarship management system 110 can notify the student of the ineligibility. In some examples, the scholarship management system 110 can indicate to the student the reasons for the ineligibility and/or how to correct the causes of the ineligibility. On the other hand, if the scholarship management system 110 determines that a student is eligible, at step 722, the scholarship management system 110 can verify the student and scholarship (and school or school system) match. The scholarship management system 110 can perform such verification based on, for example, the eligibility status of the student. In some cases, the scholarship management system 110 can also perform such verification based on other student application information, scholarship information, school information, matching information, etc.

At step 724, the scholarship management system 110 can provide a scholarship award for that student. In some cases, the scholarship management system 110 can send the student a conditional scholarship award. The student can then confirm or decline the conditional award. If the student confirms the award before an expiration deadline, the conditional award can become a confirmed award, else the conditional award can expire.

At step 726, the scholarship management system 110 can obtain a school commitment form which can define the actual and/or exact tuition and fees for that student.

At step 728, the scholarship management system 110 can then reserve the scholarship funds for that student and the student's school. The scholarship management system 110 can use the information from the school commitment form (e.g., the tuition and fees) to determine how much to reserve for the student's scholarship. The student can then use the scholarship funds to attend that school.

At step 730, the scholarship management system 110 can receive an attendance report from the student's school. The attendance report can be used to verify that the student is indeed attending the school and/or meeting any attendance requirements for the student's scholarship. In some examples, the scholarship management system 110 can receive an attendance report for that student every quarter or semester. In other examples, the scholarship management system 110 can receive an attendance report for the student at a different time(s) or time interval, such as weekly, monthly, yearly, etc.

At step 732, if the scholarship management system 110 is able to confirm that the student is attending the school or has met the scholarship's attendance requirements, the scholarship management system 110 can send a check and invoice to the student's school.

FIG. 8 illustrates an example cloud map diagram 800 depicting different factors that can be used to match students to scholarships. In this example, the matching engine 124 can generate student-scholarship matches 840 based on a combination of factors 802, 806, 808, 818, 824, and 832. The combination of factors analyzed and/or weighed by the matching engine 124 to generate the student-scholarship matches 840 can include student data 802, student eligibility data 806, student priorities 808, school data 818, scholarship pools 824, and events 832.

The student data 802 can include application data 804 submitted by a student in the student's scholarship application. Such application data 804 can include, for example and without limitation, biographical data, the student's household income, the district in which the student resides, any education programs applicable to the student, whether the student or a family member has previously received a scholarship under the scholarship program the student is applying under, the student's reservation date, the student's school preference(s), and/or any other relevant information about the student.

The student eligibility data 806 can include an indication of whether the student is eligible for a scholarship under the scholarship program. In some examples, the student eligibility data 806 can also include an eligibility amount calculated for the student. The eligibility amount can indicate the scholarship amount that the student is eligible for. The eligibility amount can be determined based on one or more factors such as, for example, the student's household income, the district where the student resides, whether the student and/or a relative has received a scholarship under the scholarship program, whether the student qualifies for any education program, etc.

The student priorities 808 can include a scholarship priority or ranking calculated for each student relative to the other students in the scholarship program. The student priorities 808 can be based on the household income 810 of the student, the reservation date 812 of the student, the student's school preferences 814, and any other priority factors 816, such as whether the student or a relative has received a scholarship under the scholarship program, whether the student qualifies for one or more education programs, etc.

In some cases, when calculating student priorities 808, the matching engine 124 can apply one or more weights to one or more of prioritization factors (e.g., 810, 812, 814, 816). For example, the matching engine 124 can weigh reservation dates 812 more than household income 810 and/or other priority factors 816 such as whether the student or a relative has received a scholarship under the scholarship program. The different weights and/or factors can affect a student's priority by increasing or decreasing that student's priority relative to other students based on the different weights and/or factors.

In some cases, the matching engine 124 can also apply different weights to different values of a same factor. For example, the matching engine 124 can apply a higher weight to household income 810 when the household income is below a certain threshold than when the household income is above such threshold. As another example, the matching engine 124 can apply a higher weight to an earlier reservation date than an older reservation date.

In this way, the matching engine 124 can implement any combination of prioritization factors and apply any weighing scheme for any of the prioritization factors in order to increase the flexibility, accuracy, fairness, performance, and/or granularity of the student prioritization process. By increasing the flexibility, accuracy, performance, and/or granularity of the student prioritization process, the matching engine 124 can also improve the efficiency, performance, and scalability of the scholarship management system 110 and the scholarship programs managed by the scholarship management system.

The schools data 818 can include the slots available 820 at a particular school and the tuition/fees 822 at the particular school (which can be specific to grades and/or education programs). In some examples, the schools data 818 can include other information about a school such as, for example, the school system associated with the school, the name and address of the school, the grades and/or education programs available at the school, and/or any other school information.

The scholarship pools 824 can include one or more designated school pools 826, which can correspond to specific schools; one or more school system pools 828, which can correspond to specific school systems; and an undesignated pool, which can correspond to scholarship donations/funds that are not designated to any particular school or school system.

The events 832 can include expiration events 834, such as scholarship expirations which can be based on a student's or guardian's failure to take or complete a certain action requested/required; scholarship withdrawals 836 which can be based on a student's failure to meet school attendance requirements and/or a student's withdrawal from a school or scholarship program; and adjustments 838 such as tuition adjustments, school costs, school/tuition discounts, student eligibility adjustments, student eligibility amount adjustments, student education program changes, etc.

FIG. 9 illustrates an example method 900 for managing scholarship programs. The steps outlined in the method 900 are examples and can be implemented in any combination thereof, including combinations that exclude, add, or modify certain steps. For the sake of clarity and explanation purposes, the method 900 is described with reference to the scholarship management system 110 configured to practice the steps in the method 900.

At step 902, the method 900 can include receiving, by the scholarship management system 110, scholarship applications associated with a plurality of students. Each scholarship application can identify one or more school preferences and a household income of a student associated with the scholarship application. The one or more school preferences can define a ranked set of school entities (e.g., schools, school systems) selected by the student. For example, the one or more school preferences can identify a number of schools with each school given a priority/ranking relative to any other school.

A scholarship application can also include additional information about an associated student, such as biographical information, an indication of whether the student has previously received a scholarship under a scholarship program managed by the scholarship management system 110, an indication of the particular school district where the student resides, whether the student needs or is entitled to participate in a particular education program (e.g., ELL, IDEA, gifted, IEP, etc.), information about the parent(s) or guardian(s) of the student, etc. In some examples, the scholarship application can also include information about one or more relatives of the student. For example, the scholarship application can indicate whether a relative of the student has received a scholarship under a scholarship program managed by the scholarship management system 110.

At step 904, the method 900 can include calculating, by the scholarship management system 110, a prioritized scholarship queue of students based on the scholarship applications and a set of criteria comprising reservation dates associated with the students. The reservation date of a student can be based on when a scholarship reservation associated with that student was received.

Moreover, in some examples, the set of criteria can include the reservation dates and the household incomes of students. Thus, the prioritized scholarship queue can be at least partly based on the reservation dates and the household income associated with each student. In some cases, the prioritized scholarship queue can also be based on the household size associated with the student, which can be another criterion in the set of criteria.

In some examples, calculating the prioritized scholarship queue can include assigning relative priorities to the students based on the reservation dates and the household income associated with each student. Moreover, in some examples, students having an earlier reservation date than other students and a lower household income than the other students can be assigned a higher priority than the other students. In some cases, the earlier reservation date can be a reservation date prior to a particular date or deadline and before respective reservation dates associated with the other students.

In some cases, assigning relative priorities to the students can be further based on other criteria from the set of criteria such as, for example, respective school districts where the students reside (e.g., specific low performing districts, other districts, etc.), whether the students have previously received a scholarship from a scholarship program associated with the scholarship management system 110, and/or whether the students have any relatives that have received a scholarship from the scholarship program.

In some implementations, those students that live in one of a predetermined set of school districts (e.g., Focus district, priority district, etc.), have previously received a scholarship from the scholarship program, or have any relatives that have received a scholarship from the scholarship program can be given a priority boost based on a first come, first served reservation system or a lottery system.

Moreover, in some cases, the prioritized scholarship queue can include a first priority queue, a second priority queue having a lower priority than the first priority queue, and/or a third priority queue having a lower priority than both the first priority queue and the second priority queue. The first priority queue can include a first set of students having reservation dates prior to a particular reservation deadline and household incomes that are below a first household income threshold (which can be relative to the federal poverty line for example), the second priority queue can include a second set of students having reservation dates prior to the particular reservation deadline and household incomes that are below a second household income threshold that is higher than the first household income threshold, and the third priority queue can include a third set of students having reservation dates after the particular reservation deadline.

At step 906, the method 900 can include matching, by the scholarship management system 110, each student in the prioritized scholarship queue with one or more scholarships for one or more school entities (e.g., schools, school systems) identified in the school preferences associated with the student. In some examples, each student can be matched with the one or more scholarships according to a priority order of the student in the prioritized scholarship queue. For example, a student having a higher priority in the prioritized scholarship queue than another student can be matched before the other student. The scholarship management system 110 can iterate through the prioritized scholarship queue, matching students to scholarship(s) in a prioritized order.

At step 908, the method 900 can include, for each student, determining, by the scholarship management system 110, whether one or more scholarship pools (e.g., 826, 828, 830) from a plurality of scholarship pools (e.g., 824) have sufficient funds for the one or more scholarships. The one or more scholarship pools can correspond to the one or more school entities identified in the school preferences associated with the student. A school entity can include a specific school or school system, for example. In some cases, a scholarship pool can be a first scholarship pool (e.g., 826) reserved for a particular school from a plurality of schools participating in a scholarship program, a second scholarship pool (e.g., 828) reserved for a particular school system from a plurality of school systems participating in the scholarship program, or an unreserved scholarship pool (e.g., 830).

In some aspects, determining whether one or more scholarship pools have sufficient funds for the one or more scholarships can include determining that a first scholarship pool from the one or more scholarship pools has sufficient funds for a first scholarship from the one or more scholarships and determining that a second scholarship pool from the one or more scholarship pools has sufficient funds for a second scholarship from the one or more scholarships. The first scholarship pool can correspond to a first school entity from the one or more school entities and the second scholarship pool corresponds to a second school entity from the one or more school entities.

When the school preferences associated with the student assign the first school entity a higher priority than the second school entity, the method 900 can include reserving funds for the first scholarship from the first scholarship pool, and when the school preferences associated with the student assign the first school entity a lower priority than the second school entity, the method 900 can include reserving funds for the second scholarship from the second scholarship pool.

At step 910, the method 900 can include, when a scholarship pool from the one or more scholarship pools has sufficient funds for a scholarship from the one or more scholarships, reserving, by the scholarship management system 110, funds for the scholarship from the scholarship pool.

In some cases, the method 900 can include, when none of the one or more scholarship pools have sufficient funds for any of the one or more scholarships, wait listing the student until sufficient funds become available from at least one of the one or more scholarship pools.

In some aspects, the method 900 can include receiving, by the scholarship management system 110, a plurality of scholarship donations and placing the plurality of scholarship donations into corresponding scholarship pools from the plurality of scholarship pools. Each scholarship donation can include a first reserved donation designated for a particular school from a plurality of schools participating in a scholarship program, a second reserved donation designated for a particular school system from a plurality of school systems participating in the scholarship program, or an unreserved scholarship donation. Moreover, any first reserved donation can be placed in a first reserved scholarship pool designated for the particular school associated with the first reserved donation, any second reserved donation can be placed in a second reserved scholarship pool designated for the particular school system associated with the second reserved donation, and any unreserved scholarship donation can be placed in an unreserved scholarship pool.

In some aspects, the method 900 can further include, prior to receiving one or more scholarship applications associated with one or more students from the plurality of students, receiving, by the scholarship management system 110, a request to verify a scholarship eligibility of the one or more students; and determining, by the scholarship management system 110, a respective scholarship eligibility status for each of the one or more students based a respective household income.

In some examples, the flowchart 700 and the method 900 may be performed by one or more computing devices or apparatuses. In one illustrative example, the flowchart 700 and the method 900 can be performed by the scholarship management system 110 shown in FIG. 1 and/or one or more computing devices with the computing device architecture 1000 shown in FIG. 10. In some cases, such a computing device or apparatus may include a processor, microprocessor, microcomputer, or other component of a device that is configured to carry out the steps of the flowchart 700 and the method 900. Such computing device can include a network interface configured to communicate data.

The flowchart 700 and the method 900 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the flowchart 700 and the method 900 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 10 illustrates an example computing device architecture 1000 of an example computing device which can implement various techniques described herein. For example, the computing device architecture 1000 can implement at least some portions of the scholarship management system 110 shown in FIG. 1, and perform tracking, localization, mapping, and rendering operations as described herein. The components of the computing device architecture 1000 are shown in electrical communication with each other using a connection 1005, such as a bus. The example computing device architecture 1000 includes a processing unit (CPU or processor) 1010 and a computing device connection 1005 that couples various computing device components including the computing device memory 1015, such as read only memory (ROM) 1020 and random access memory (RAM) 1025, to the processor 1010.

The computing device architecture 1000 can include a cache of high-speed memory connected directly with, in close proximity to, or integrated as part of the processor 1010. The computing device architecture 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other computing device memory 1015 may be available for use as well. The memory 1015 can include multiple different types of memory with different performance characteristics. The processor 1010 can include any general purpose processor and a hardware or software service, such as service 1 1032, service 2 1034, and service 3 1036 stored in storage device 1030, configured to control the processor 1010 as well as a special-purpose processor where software instructions are incorporated into the processor design. The processor 1010 may be a self-contained system, containing multiple cores or processors, a bus, memory controller, cache, etc. A multicore processor may be symmetric or asymmetric.

To enable user interaction with the computing device architecture 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art, such as a display, projector, television, speaker device, etc. In some instances, multimodal computing devices can enable a user to provide multiple types of input to communicate with the computing device architecture 1000. The communications interface 1040 can generally govern and manage the user input and computing device output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof. The storage device 1030 can include services 1032, 1034, 1036 for controlling the processor 1010. Other hardware or software modules are contemplated. The storage device 1030 can be connected to the computing device connection 1005. In one aspect, a hardware module that performs a particular function can include the software component stored in a computer-readable medium in connection with the necessary hardware components, such as the processor 1010, connection 1005, output device 1035, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set or "one or more of" a set" indicates that one member of the set or multiple members of the set (in any combination) satisfy the claim. For example, claim language reciting "at least one of A and B" means A, B, or A and B. In another example, claim language reciting "one or more of A and B" means A, B, or A and B. In another example, claim language reciting "one or more of A, B, and C" means A, B, C, A and B, A and C, B and C, or all of A, B, and C.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method comprising:
   receiving, by a scholarship management system comprising one or more computing devices, scholarship applications associated with a plurality of students, the scholarship applications requesting scholarships for a plurality of school entities, each scholarship application identifying school preferences and a household income associated with a student, the school preferences defining a ranked set of school entities selected by the student;
   calculating, by the scholarship management system, a plurality of prioritized scholarship queues of students based on the school preferences, reservation timestamps associated with the plurality of students and the household income associated with each student, each of the plurality of students being included in different prioritized scholarship queues associated with respective school entities from the ranked set of school entities, each of the plurality of students being assigned a respective priority in each queue of the different prioritized scholarship queues relative to other students in the queue, the respective priority being based on a reservation timestamp of the scholarship application associated with that student relative to reservation timestamps of scholarship applications associated with other students in the queue, the school preferences associated with that student, and the household income associated with that student relative to household incomes associated with other students in the queue;
   matching, by the scholarship management system, each student in the plurality of prioritized scholarship queues with one or more scholarships for one or more school entities identified in the school preferences associated with the student, each student being matched with the one or more scholarships according to a priority order of the student in one or more of the plurality of prioritized scholarship queues associated with the one or more school entities;
   for each student, determining, by the scholarship management system, whether one or more scholarship pools from a plurality of scholarship pools have sufficient funds for the one or more scholarships, the one or more scholarship pools corresponding to the one or more school entities identified in the school preferences associated with the student, wherein the determining whether one or more scholarship pools have sufficient funds for the one or more scholarships comprises:
     identifying, based on the school preferences, a first school having a highest ranking from the ranked set of school entities selected by the student;
     determining, based on at least one of an eligibility amount associated with the student and a cost associated with the first school, whether a first scholarship pool, a second scholarship pool, a third scholarship pool, or a combination of any of the first scholarship pool, the second scholarship pool, or the third scholarship pool, has sufficient funds for a scholarship to the student for the first school; and
     determining whether to reserve funds for the scholarship to the student for the first school from the first scholarship pool, the second scholarship pool, the third scholarship pool, or the combination of any of the first scholarship pool, the second scholarship pool, or the third scholarship pool, wherein the first scholarship pool comprises funds designated for the first school, the second scholarship pool comprises funds designated for a particular school system associated with the first school, and the third scholarship pool comprises an unreserved scholarship pool; and
   when a scholarship pool from the one or more scholarship pools has sufficient funds for the scholarship from the one or more scholarships, reserving, by the scholarship management system, funds for the scholarship from the scholarship pool.

2. The method of claim 1, further comprising:
   based on a determination that none of the one or more scholarship pools have sufficient funds for any of the one or more scholarships, wait listing the student until sufficient funds become available from at least one of the one or more scholarship pools;
   after wait listing the student, determining that sufficient funds have become available for the scholarship from the scholarship pool of the one or more scholarship pools; and
   reserving funds for the scholarship from the scholarship pool.

3. The method of claim 1, wherein determining, for each student, whether one or more scholarship pools have sufficient funds for the one or more scholarships further comprises:
   determining, based on at least one of the eligibility amount associated with the student and the cost associated with the first school, that the first scholarship pool designated for the first school does not have sufficient funds for the scholarship to the student for the first school;
   determining, based on at least one of the eligibility amount associated with the student and the cost associated with the first school, whether the second scholarship pool designated for the school system associated with the first school or the combination of the first scholarship pool and the second scholarship school has sufficient funds for the scholarship to the student for the first school; and determining whether to reserve funds for the scholarship to the student for the first school from the second scholarship pool or the combination of the first scholarship pool and the second scholarship pool, based on whether the second scholarship school or the combination of the first scholarship pool and the second scholarship pool has sufficient funds for the scholarship to the student for the first school.

4. The method of claim 3, further comprising:
determining that the second scholarship pool designated for the school system and the combination of the first scholarship pool and the second scholarship school do not have sufficient funds for the scholarship to the student for the first school;
determining, based on at least one of the eligibility amount associated with the student and the cost associated with the first school, whether the unreserved scholarship pool or the combination of any of the first scholarship pool, the second scholarship school, or the third scholarship pool comprising the unreserved scholarship pool has sufficient funds for the scholarship to the student for the first school;
when the unreserved scholarship pool or the combination of any of the first scholarship pool, the second scholarship school, or the third scholarship pool has sufficient funds for the scholarship to the student for the first school, reserving funds for the scholarship to the student for the first school using the unreserved scholarship pool or the combination of any of the first scholarship pool, the second scholarship school, or the third scholarship pool; and
when the unreserved scholarship pool or the combination of any of the first scholarship pool, the second scholarship school, or the third scholarship pool does not have sufficient funds for the scholarship to the student for the first school, determining whether a fourth scholarship pool reserved for a second school from the ranked set of school entities or a combination of any of the fourth scholarship pool, a fifth scholarship school reserved for a respective school system associated with the second school, and the unreserved scholarship pool has sufficient funds for a different scholarship to the student for the second school, the second school having a lower ranking than the first school.

5. The method of claim 1, wherein calculating the plurality of prioritized scholarship queues comprises:
for each queue of the plurality of prioritized scholarship queues of students, assigning relative priorities to a respective set of students in the queue of the plurality of prioritized scholarship queues of students, the relative priorities being at least partly based on relative household incomes associated with the respective set of students in the queue nt, wherein one or more students in the queue having a lower household income are assigned a higher priority within the queue than one or more other students in the queue having a higher household income.

6. The method of claim 5, wherein the relative priorities assigned to the respective set of students are further based on whether the respective set of students have previously received a respective scholarship from a scholarship program associated with the scholarship management system, and wherein a given student in the queue that has previously received the respective scholarship from the scholarship program is given a priority boost relative to other students in the queue who have not previously received the respective scholarship from the scholarship program.

7. The method of claim 5, wherein the relative priorities assigned to the respective set of students are further based on whether the respective set of students have any relatives who have received a respective scholarship from a scholarship program associated with the scholarship management system, and wherein a given student in the queue that has one or more relatives who have received the respective scholarship from the scholarship program is given a priority boost relative to other students in the queue who do not have any relatives who have received the respective scholarship from the scholarship program.

8. The method of claim 1, wherein the plurality of prioritized scholarship queues comprises a first priority queue, a second priority queue having a lower priority than the first priority queue, and a third priority queue having a further lower priority than both the first priority queue and the second priority queue, wherein the first priority queue comprises a first set of students having reservation timestamps prior to a particular reservation deadline and household incomes that are below a first household income threshold, wherein the second priority queue comprises a second set of students having reservation timestamps prior to the particular reservation deadline and household incomes that are below a second household income threshold that is higher than the first household income threshold, and wherein the third priority queue comprises a third set of students having reservation timestamps after the particular reservation deadline.

9. The method of claim 1, further comprising:
receiving, by the scholarship management system, a plurality of scholarship donations, each scholarship donation comprising one of a first reserved donation designated for a particular school from a plurality of schools participating in a scholarship program, a second reserved donation designated for a particular school system from a plurality of school systems participating in the scholarship program, or an unreserved scholarship donation; and
placing the plurality of scholarship donations into corresponding scholarship pools from the plurality of scholarship pools, wherein any scholarship donation comprising the first reserved donation is placed in a first reserved scholarship pool designated for the particular school associated with the first reserved donation, wherein any scholarship donation comprising the second reserved donation is placed in a second reserved scholarship pool designated for the particular school system associated with the second reserved donation, wherein any scholarship donation comprising the unreserved scholarship donation is placed in an unreserved scholarship pool.

10. The method of claim 9, wherein the scholarship management system varies prioritization of a use of funds by first using a smallest donation and then using increasingly larger donations in sequential order.

11. A system comprising:
one or more processors; and
at least one computer-readable medium having stored therein instructions which, when executed by the one or more processors, cause the system to:
receive scholarship applications associated with a plurality of students, the scholarship applications requesting scholarships for a plurality of school entities, each scholarship application identifying school preferences and a household income associated with a student, the school preferences defining a ranked set of school entities selected by the student;

calculate a plurality of prioritized scholarship queues of students based on the school preferences, reservation timestamps associated with the plurality of students and the household income associated with each student, each of the plurality of students being included in different prioritized scholarship queues associated with respective school entities from the ranked set of school entities, each of the plurality of students being assigned a respective priority in each queue of the different prioritized scholarship queues relative to other students in the queue, the respective priority being based on a reservation timestamp of the scholarship application associated with that student relative to reservation timestamps of scholarship applications associated with other students in the queue, the school preferences associated with that student, and the household income associated with that student relative to household incomes associated with other students in the queue;

match each student in the plurality of prioritized scholarship queues with one or more scholarships for one or more school entities identified in the school preferences associated with the student, each student being matched with the one or more scholarships according to a priority order of the student in one or more of the plurality of prioritized scholarship queues associated with the one or more school entities;

for each student, determine whether one or more scholarship pools from a plurality of scholarship pools have sufficient funds for the one or more scholarships, the one or more scholarship pools corresponding to the one or more school entities identified in the school preferences associated with the student, wherein the determining whether one or more scholarship pools have sufficient funds for the one or more scholarships comprises:

identifying, based on the school preferences, a first school having a highest ranking from the ranked set of school entities selected by the student;

determining, based on at least one of an eligibility amount associated with the student and a cost associated with the first school, whether a first scholarship pool, a second scholarship pool, a third scholarship pool, or a combination of any of the first scholarship pool, the second scholarship pool, or the third scholarship pool, has sufficient funds for a scholarship to the student for the first school; and determining whether to reserve funds for the scholarship to the student for the first school from the first scholarship pool, the second scholarship pool, the third scholarship pool, or the combination of any of the first scholarship pool, the second scholarship pool, or the third scholarship pool, wherein the first scholarship pool comprises funds designated for the first school, the second scholarship pool comprises funds designated for a particular school system associated with the first school, and the third scholarship pool comprises an unreserved scholarship pool; and when a scholarship pool from the one or more scholarship pools has sufficient funds for the scholarship from the one or more scholarships, reserve funds for the scholarship from the scholarship pool.

12. The system of claim 11, the at least one computer-readable medium having stored therein instructions which, when executed by the one or more processors, cause the system to:

based on a determination that none of the one or more scholarship pools have sufficient funds for any of the one or more scholarships, wait list the student until sufficient funds become available from at least one of the one or more scholarship pools; and after wait listing the student, determine that sufficient funds have become available for the scholarship from the scholarship pool of the one or more scholarship pools.

13. The system of claim 11, wherein determining whether one or more scholarship pools have sufficient funds for the one or more scholarships comprises:

determining that the first scholarship pool from the one or more scholarship pools has sufficient funds for a first scholarship from the one or more scholarships, wherein the first scholarship pool corresponds to the first school;

determining that the second scholarship pool from the one or more scholarship pools has sufficient funds for a second scholarship from the one or more scholarships, wherein the second scholarship pool corresponds to a second school from the one or more school entities; and when the school preferences associated with the student assign the first school a higher priority than the second school, reserving funds for the first scholarship from the first scholarship pool.

14. The system of claim 11, wherein calculating the plurality of prioritized scholarship queues comprises:

for each queue of the plurality of prioritized scholarship queues of students, assigning relative priorities to a respective set of students in the queue of the plurality of prioritized scholarship queues of students, the relative priorities being at least partly based on whether the respective set of students have any relatives who have received the respective scholarship from an associated scholarship program.

15. The system of claim 11, wherein calculating the plurality of prioritized scholarship queues comprises:

for each queue of the plurality of prioritized scholarship queues of students, assigning relative priorities to a respective set of students in the queue of the plurality of prioritized scholarship queues of students, the relative priorities being at least partly based on relative household incomes associated with the respective set of students in the queue.

16. The system of claim 15, wherein relative priorities assigned to the respective set of students are further based on whether the respective set of students have previously received a respective scholarship from an associated scholarship program.

17. The system of claim 11, wherein the plurality of prioritized scholarship queues comprises a first priority queue, a second priority queue having a lower priority than the first priority queue, and a third priority queue having a further lower priority than both the first priority queue and the second priority queue, wherein the first priority queue comprises a first set of students having reservation timestamps prior to a particular reservation deadline and household incomes that are below a first household income threshold, wherein the second priority queue comprises a second set of students having reservation timestamps prior to the particular reservation deadline and household incomes that are below a second household income threshold that is higher than the first household income threshold, and wherein the third priority queue comprises a third set of students having reservation timestamps after the particular reservation deadline.

18. At least one non-transitory computer-readable medium comprising:
instructions which, when executed by one or more processors, cause the one or more processors to:
receive scholarship applications associated with a plurality of students, the scholarship applications requesting scholarships for a plurality of school entities, each scholarship application identifying school preferences and a household income associated with a student, the school preferences defining a ranked set of school entities selected by the student;
calculate a plurality of prioritized scholarship queues of students based on the school preferences, reservation timestamps associated with the plurality of students and the household income associated with each student, each of the plurality of students being included in different prioritized scholarship queues associated with respective school entities from the ranked set of school entities, each of the plurality of students being assigned a respective priority in each queue of the different prioritized scholarship queues relative to other students in the queue, the respective priority being based on a reservation timestamp of the scholarship application associated with that student relative to reservation timestamps of scholarship applications associated with other students in the queue, the school preferences associated with that student, and the household income associated with that student relative to household incomes associated with other students in the queue;
match each student in the plurality of prioritized scholarship queues with one or more scholarships for one or more school entities identified in the school preferences associated with the student, each student being matched with the one or more scholarships according to a priority order of the student in one or more of the plurality of prioritized scholarship queues associated with the one or more school entities;
for each student, determine whether one or more scholarship pools from a plurality of scholarship pools have sufficient funds for the one or more scholarships, the one or more scholarship pools corresponding to the one or more school entities identified in the school preferences associated with the student, wherein the determining whether one or more scholarship pools have sufficient funds for the one or more scholarships comprises:
identifying, based on the school preferences, a first school having a highest ranking from the ranked set of school entities selected by the student;
determining, based on at least one of an eligibility amount associated with the student and a cost associated with the first school, whether a first scholarship pool, a second scholarship pool, a third scholarship pool, or a combination of any of the first scholarship pool, the second scholarship pool, or the third scholarship pool, has sufficient funds for a scholarship to the student for the first school; and
determining whether to reserve funds for the scholarship to the student for the first school from the first scholarship pool, the second scholarship pool, the third scholarship pool, or the combination of any of the first scholarship pool, the second scholarship pool, or the third scholarship pool, wherein the first scholarship pool comprises funds designated for the first school, the second scholarship pool comprises funds designated for a particular school system associated with the first school, and the third scholarship pool comprises an unreserved scholarship pool; and
when a scholarship pool from the one or more scholarship pools has sufficient funds for the scholarship from the one or more scholarships, reserve funds for the scholarship from the scholarship pool.

19. The at least one non-transitory computer-readable medium of claim 18, wherein calculating the plurality of prioritized scholarship queues comprises:
for each queue of the plurality of prioritized scholarship queues of students, assigning relative priorities to a respective set of students in the queue of the plurality of prioritized scholarship queues of students, the relative priorities being at least partly based on relative household incomes associated with the respective set of students in the queue and whether the respective set of students have any relatives who have received a respective scholarship from an associated scholarship program, and wherein a given student in the queue having a lower household income and one or more relatives who have received the respective scholarship is given a priority boost relative to other students in the queue having a higher household income or not having any relatives who have received the respective scholarship.

20. The at least one non-transitory computer-readable medium of claim 18, wherein determining whether one or more scholarship pools have sufficient funds for the one or more scholarships comprises:
determining that the first scholarship pool from the one or more scholarship pools has sufficient funds for a first scholarship from the one or more scholarships, wherein the first scholarship pool corresponds to the first school;
determining that a second scholarship pool from the one or more scholarship pools has sufficient funds for a second scholarship from the one or more scholarships, wherein the second scholarship pool corresponds to a second school from the one or more school entities; and
when the school preferences associated with the student assign the first school entity a lower priority than the second school, reserving funds for the second scholarship from the second scholarship pool.

* * * * *